US008488885B2

(12) United States Patent
Cortopassi et al.

(10) Patent No.: US 8,488,885 B2
(45) Date of Patent: Jul. 16, 2013

(54) METHOD AND APPARATUS FOR USING PRESSURE INFORMATION FOR IMPROVED COMPUTER CONTROLLED HANDWRITING RECOGNITION DATA ENTRY AND USER AUTHENTICATION

(75) Inventors: Michael Cortopassi, Arlington Heights, IL (US); Edward Endejan, Gurnee, IL (US)

(73) Assignee: Access Co., Ltd., Tokyo (JP)

( * ) Notice: Subject to any disclaimer, the term of this patent is extended or adjusted under 35 U.S.C. 154(b) by 544 days.

(21) Appl. No.: 12/395,722

(22) Filed: Mar. 2, 2009

(65) Prior Publication Data

US 2009/0202153 A1  Aug. 13, 2009

Related U.S. Application Data

(60) Division of application No. 10/672,382, filed on Sep. 25, 2003, now Pat. No. 7,499,589, which is a continuation of application No. 09/516,656, filed on Mar. 1, 2000, now Pat. No. 6,707,942.

(51) Int. Cl.
G06K 9/18 (2006.01)

(52) U.S. Cl.
USPC ............................ 382/186; 382/313; 345/179

(58) Field of Classification Search
USPC ................... 382/119, 120, 123, 187
See application file for complete search history.

(56) References Cited

U.S. PATENT DOCUMENTS

| 4,318,096 A | 3/1982 | Thornburg et al. ........... 345/179 |
| 4,837,798 A | 6/1989 | Cohen et al. |

(Continued)

FOREIGN PATENT DOCUMENTS

| EP | 0779759 A3 | 11/1999 |
| WO | WO 9406236 | 3/1994 |
| WO | WO 9714244 | 4/1997 |

OTHER PUBLICATIONS

AirMobile Software keeps your cars in service and emergency responders up to date, Fact Sheet, 2005, Motorola, Inc.

(Continued)

*Primary Examiner* — Tom Y Lu
(74) *Attorney, Agent, or Firm* — Berry & Associates P.C.

(57) ABSTRACT

A method and system utilizing both (x, y) coordinate ("spatial") stroke data and associated pressure information for improved handwriting recognition. The method and system can also be applied to all types of handwriting-based data entry applications and also to user authentication. The digitizer pad used in the computer system gives both spatial information and associated pressure data when a stroke is being drawn thereon, e.g., by a stylus. Pressure information can be used to differentiate between different character sets, e.g., upper case and lower case characters for certain alphabetic characters. The spatial stroke data then identifies the particular character. The pressure information can also be used to adjust any display attribute, such as character font size, font selection, color, italic, bold, underline, shadow, language, etc. The associated pressure information can also be used for recognizing a signature. In this case, a user is allowed to sign a name on the digitizer pad. This provides non-character based user authentication that relies not only on the spatial stroke data but also on the pressure applied at different points in the signed name or image. Pressure information can also be used to provide improved handwriting-based data entry. For instance, in a drafting program, the pressure of a drawn line can be used to determine its width. Generally, pressure data can also be used to improve handwriting recognition tasks and heuristics.

3 Claims, 17 Drawing Sheets

U.S. PATENT DOCUMENTS

| | | | | |
|---|---|---|---|---|
| 4,972,496 | A | | 11/1990 | Sklarew ............................ 382/187 |
| 5,029,219 | A | | 7/1991 | Cox ................................... 382/121 |
| 5,040,222 | A | * | 8/1991 | Muroya ............................ 382/123 |
| 5,049,862 | A | * | 9/1991 | Dao et al. ......................... 345/179 |
| 5,062,143 | A | | 10/1991 | Schmitt ............................... 382/36 |
| 5,128,672 | A | | 7/1992 | Kaehler ................................ 341/23 |
| 5,291,302 | A | | 3/1994 | Gordon et al. |
| 5,327,486 | A | | 7/1994 | Wolff et al. |
| 5,347,589 | A | | 9/1994 | Meeks et al. .................... 382/119 |
| 5,434,959 | A | | 7/1995 | Von Ehr et al. ................ 345/441 |
| 5,465,401 | A | | 11/1995 | Thompson |
| 5,467,390 | A | | 11/1995 | Brankley et al. |
| 5,479,536 | A | | 12/1995 | Comerford ....................... 382/230 |
| 5,502,757 | A | | 3/1996 | Bales et al. |
| 5,533,141 | A | | 7/1996 | Futatsugi et al. ............... 382/119 |
| 5,541,976 | A | | 7/1996 | Ghisler |
| 5,596,350 | A | | 1/1997 | Capps et al. ..................... 345/173 |
| 5,615,285 | A | | 3/1997 | Beernink ........................... 382/189 |
| 5,666,530 | A | | 9/1997 | Clark et al. |
| 5,680,470 | A | | 10/1997 | Moussa et al. .................. 382/119 |
| 5,724,449 | A | | 3/1998 | Conerford ....................... 382/230 |
| 5,724,457 | A | | 3/1998 | Fukushima ...................... 382/311 |
| 5,727,202 | A | | 3/1998 | Kucala |
| 5,730,468 | A | | 3/1998 | Wirtz ................................. 283/70 |
| 5,734,749 | A | | 3/1998 | Yamada et al. .................. 382/187 |
| 5,734,750 | A | | 3/1998 | Arai et al. ........................ 382/202 |
| 5,737,592 | A | | 4/1998 | Nguyen et al. |
| 5,742,905 | A | | 4/1998 | Pepe et al. |
| 5,761,621 | A | | 6/1998 | Sainton |
| 5,790,974 | A | | 8/1998 | Tognazzini |
| 5,809,415 | A | | 9/1998 | Rossmann |
| 5,818,963 | A | | 10/1998 | Murdock et al. ................ 382/187 |
| 5,825,865 | A | | 10/1998 | Oberlander et al. |
| 5,832,218 | A | | 11/1998 | Gibbs et al. |
| 5,857,201 | A | | 1/1999 | Wright, Jr. et al. |
| 5,864,635 | A | | 1/1999 | Zetts et al. ....................... 382/187 |
| 5,867,688 | A | | 2/1999 | Simmon et al. |
| 5,870,765 | A | | 2/1999 | Bauer et al. |
| 5,884,323 | A | | 3/1999 | Hawkins et al. |
| 5,889,888 | A | | 3/1999 | Marianetti, II et al. ........ 382/187 |
| 5,896,321 | A | | 4/1999 | Miller et al. ................ 365/189.01 |
| 5,900,875 | A | | 5/1999 | Haitani et al. ................... 345/349 |
| 5,903,832 | A | | 5/1999 | Seppanen et al. |
| 5,940,532 | A | | 8/1999 | Tanaka ............................ 382/185 |
| 5,963,666 | A | | 10/1999 | Fujisaki et al. ................ 382/187 |
| 5,966,714 | A | | 10/1999 | Huang et al. |
| 5,974,238 | A | | 10/1999 | Chase, Jr. |
| 5,987,517 | A | | 11/1999 | Firth et al. |
| 6,002,918 | A | | 12/1999 | Heiman et al. |
| 6,018,671 | A | | 1/2000 | Bremer |
| 6,021,218 | A | | 2/2000 | Capps et al. ..................... 382/187 |
| 6,035,324 | A | | 3/2000 | Chang et al. |
| 6,038,603 | A | | 3/2000 | Joseph |
| 6,081,621 | A | | 6/2000 | Ackner ............................. 382/216 |
| 6,112,099 | A | | 8/2000 | Ketola |
| 6,119,003 | A | | 9/2000 | Kukkohovi |
| 6,154,745 | A | | 11/2000 | Kari et al. |
| 6,160,914 | A | * | 12/2000 | Muroya ............................ 382/187 |
| 6,188,909 | B1 | | 2/2001 | Alanara et al. |
| 6,192,410 | B1 | | 2/2001 | Miller et al. |
| 6,212,299 | B1 | | 4/2001 | Yuge ................................. 382/231 |
| 6,222,847 | B1 | | 4/2001 | Ball et al. |
| 6,263,437 | B1 | | 7/2001 | Liao et al. |
| 6,311,288 | B1 | | 10/2001 | Heeren et al. |
| 6,320,943 | B1 | | 11/2001 | Borland |
| 6,370,566 | B2 | | 4/2002 | Discolo et al. |
| 6,389,124 | B1 | | 5/2002 | Schnarel et al. |
| 6,408,092 | B1 | | 6/2002 | Sites ................................. 382/187 |
| 6,505,215 | B1 | | 1/2003 | Kruglikov et al. |
| 6,571,103 | B1 | | 5/2003 | Novakov |
| 6,601,111 | B1 | | 7/2003 | Peacock et al. |
| 6,608,637 | B1 | | 8/2003 | Beaton et al. |
| 6,633,924 | B1 | | 10/2003 | Wu et al. |
| 6,672,775 | B1 | | 1/2004 | Narayanaswami |
| 6,697,638 | B1 | | 2/2004 | Larsson et al. |
| 6,711,609 | B2 | | 3/2004 | Boyer et al. |
| 6,714,222 | B1 | | 3/2004 | Bjorn et al. |
| 6,728,786 | B2 | | 4/2004 | Hawkins et al. |
| 6,950,645 | B1 | | 9/2005 | Kammer et al. |
| 6,976,262 | B1 | | 12/2005 | Davis et al. |
| 6,982,962 | B1 | | 1/2006 | Lunsford et al. |
| 7,010,603 | B2 | | 3/2006 | Martin, Jr. et al. |
| 7,076,275 | B1 | | 7/2006 | Karstens et al. |
| 7,120,129 | B2 | | 10/2006 | Ayyagari et al. |
| 7,310,091 | B2 | * | 12/2007 | Liu et al. ......................... 345/179 |
| RE40,459 | E | | 8/2008 | Hawkins et al. |
| 7,506,064 | B1 | | 3/2009 | Kruger et al. |
| 7,533,342 | B1 | | 5/2009 | Vialle et al. |
| 7,693,949 | B2 | | 4/2010 | Peacock |

OTHER PUBLICATIONS

Benefon Twin GSM Brochure, 1999, Benefon Oyj, Finland.
Data Rover 840, 2000, Icras, Inc., Sunnyvale CA.
Dual-Band Sprint PCS Phone SCP-4000, User Guide, 1999, Sprint Spectrum L. P., Japan.
Dual-Band Sprint PCS Touchpoint Phone User Guide, Apr. 1999.
Ericsson R380, RSA SecurID Ready Implementation Guide, Oct. 26, 2000.
Global Messaging Services with Lotus Notes and AT&T Wireless. 1999, AT&T Global Network Services.
Hewlett Packard HP200LX.
Housel, et al., WebExpress: A client/intercept based system for optimizing Web browsing in a wireless environment, 1998, Mobile Networks and Applications 3, pp. 419-431.
IBook G3 User's Guide, 2002, Apple Computer, Inc., Taiwan.
Inouye et al., Dynamic Network Reconfiguration Support for Mobile Computers, 1997 Association for Computing Machinery, Inc. (ACM) pp. 1-10.
Java Telephony Specification, Jun. 30, 1999, JTAP version 1.3.
Joseph, et al. Rover: A Toolkit for Mobile Information Access, Feb. 27, 2003 MIT Laboratory for Computer Science.
Lambert, M., PCMAIL: A Distributed Mail System for Personal Computers, Jun. 1988, Network Working Group, MIT, pp. 1-39.
MessagePad 2100 with Newton 2.1 Operating System, 1997, Apple Computer, Inc., Cupertino, CA.
Motorola P8160 User Guide.
Motorola P8167 User Guide.
Motorola SC3160 User Guide.
Motorola V8162 User Guide.
Motorola V8162 Spanish version User Guide.
Nokia 2110 communicator, User's Guide, 1996, Nokia Mobile Phones, Issue No. 6, Finland.
Nokia 9000i User's Manual, 1998, Nokia Mobile Phones, Issue 2 EN.
Nokia 9000il Owner's Manual, Copyright 1995-1998, Nokia Mobile Phones, Issue 2 US.
Nokia 9110, User's Manual, 1999, Nokia Mobile Phones, Issue 3 EN.
Nokia 9110i User's Guide, 2004, Nokia, Issue 1 EN.
Nokia Intellisync Mobile Suite Administrator's Guide, Version 8.0, 2007 Nokia, United States.
Nortel Networks Norstar Modular Integrated Communications System, Product Brief, 2001, Nortel Networks.
Novell GroupWise Web Access User's Guide, Feb. 18, 2003, Novell, Inc., Provo, Utah.
Palm Pilot Handbook, 1997 3Com Corporation, Palm Computing, Inc. A subsidiary of 3Com Corporation, Mountain View, CA.
pdQ Basics Handbook, 1999, Rev. A, QUALCOMM Inc., San Diego CA.
RemoteWare Architecture, 2006, iAnywhere Solutions, Inc.
Salkintzis et al., an In-Band Power-Saving Protocol for Mobile Data Networks, IEEE, Transactions on Communications, Sep. 1998, vol. 46 No. 9.
Samsung M100, 2000 Sprint Spectrum, USA.
Samsumg-sch—A850 Services User Guide, 2005 Samsung Telecommunications, America, Printed in China.
Samsung SCH 8500 User Guide, 1999 Sprint Spectrum L.P., South Korea.
Schaunmann, Jan, Software Development for the Palm OS, Jun. 8, 2000.
Schmandt, Chris, Phoneshell: the Telephone as Computer Terminal, Jan. 4, 1993, geekmedia, MIT.

Sony Magic Link User's Guide Pic-1000, Personal Intelligent Communicator, 1994 Sony Corporation, Japan.

Sony Magic Link PIC-2000 User's Guide, 1995, Sony Corporation and General Magic Inc.

Universal Personal Telecommunications—Service Description (Service Set 1), Feb. 21, 1995.

What is Lotus Notes? Chapter 1 pp. 1-14.

Plaintiff Smartphone Technologies, LLC Revised Opening Claim Construction Brief in United States District Court for the Eastern District of Texas Tyler Division, *Smartphone Technologies v HTC Corporation, et al.*, Civil Action No. 6:10-cv-580, filed Feb. 3, 2012, "Document 172".

Defendant's Motion for Summary Judgment of Invalidity for Indefiniteness in United States District Court for the Eastern District of Texas Tyler Division, *Smartphone Technologies, LLC v Research in Motion Corp, et al.*, Case 6:10-cv-0074-LED-JDL & *v HTC Corporation, et al.* 6:10-cv-00580 LED-JDL, filed Feb. 16, 2012, "Document 183".

Defendant's Responsive Claim Construction Brief in United States District Court for the Eastern District of Texas Tyler Division, Smartphone Technologies, *LLC v Research in Motion Corp, et al.*, Case 6:10-cv-0074-LED-JDL & *v HTC Corporation, et al.* 6:10-cv-00580 LED-JDL, filed Feb. 16, 2012, "Document 184".

Plaintiff Smartphone Technologies, LLC Reply Brief on Claim Construction in United States District Court for the Eastern District of Texas Tyler Division, *Smartphone Technologies v HTC Corporation, et al.*, Civil Action No. 6:10-cv-580, filed Feb. 24, 2012, "Document 193".

Plaintiff Smartphone Technologies, LLC's Response in Opposition to Defendant's Motion for Summary Judgment of Invalidity for Indefiniteness in United States District Court for the Eastern District of Texas Tyler Division, *Smartphone Technologies, LLC v Research in Motion Corp, et al.*, Case 6:10-cv-0074-LED-JDL &*v HTC Corporation, et al.*, 6:10-cv-00580 LED-JDL, filed Feb. 27, 2012, "Document 196".

Plaintiff Smartphone Technologies, LLC's Response in Opposition to Defendant's Motion for Summary Judgment of Invalidity for Indefiniteness in United States District Court for the Eastern District of Texas Tyler Division, *Smartphone Technologies, LLC v Research in Motion Corp, et al.*, Case 6:10-cv-0074- LED-JDL & v HTC Corporation, et al., 6:10-cv-00580 LED-JDL, filed Mar. 2, 2012, "Document 200".

Defendant's Reply in Support of Motion for Summary Judgment of Invalidity for Indefiniteness in United States District Court for the Eastern District of Texas Tyler Division, *Smartphone Technologies, LLC v Research in Motion Corp, et al.*, Case 6:10-cv-0074-LED-JDL & v HTC Corporation, et al. 6:10-cv-00580 LED-JDL, filed Mar. 2, 2012, "Document 202".

Defendants' Joint Preliminary Invalidity Contentions and Accompanying Document Production in the United States District Court for the Eastern District of Texas Tyler Division, *Smartphone Technologies, LLC v Research in Motion Corp.; Research in Motion Ltd.; Samsung Electronics Co. Ltd,; Samsung America, Inc.; Samsung Telecommunications America, LLC.; LG Electronics, Inc.; LG Electronics USA, Inc.; Motorola, Inc.; Apple, Inc.; Pantech Wireless, Inc.; and AT&T Mobility LLC,* Case No. 6:10-cv-00074-LED filed Feb. 11, 2011.

Defendants HTC Corporation's, HTC America, Inc.'s, Sony Ericsson Mobile Communications AB'S, Sony Ericsson Mobile Communications (USA), Inc.'s, and T-Mobile USA, Inc.'s Invalidity Contentions and Production of Documents Pursuant to Patent Rules 3-3 and 3-4(b) in United States District Court for the Eastern District of Texas Tyler Division, *Smartphone Technologies, LLC v HTC Corporation's, HTC America, Inc.'s, Sony Ericsson Mobile Communications AB'S, Sony Ericsson Mobile Communications (USA), Inc.'s, and T-Mobile USA, Inc.'s,* Case No. 6:10-cv-580-LED-JDL filed Dec. 15, 2011.

Markman Claim Construction Hearing Transcript in United States District Court for the Eastern District of Texas Tyler Division, *Smartphone Technologies, LLC v Research in Motion Corp, et al.*, Case 6:10- cv-0074-Led-JDL & v HTC Corporation, et al. 6:10-cv-00580 LED-JDL Mar. 6, 2012.

Plaintiff's First Amended Disclosure of Asserted Claims in Infringement Contentions in United States District Court for the Eastern District of Texas Tyler Division, *Smartphone Technologies v HTC Corporation, et al.*, Civil Action No. 6:10-cv-580, filed Apr. 6, 2012.

"Defendants HTC Corporation's, HTC America, Inc.'s, Sony Ericsson Mobile Communications AB's, Sony Ericsson Mobile Communications (USA), Inc.'s, and T-Mobile USA, Inc.'s Invalidity Contentions and Production of Documents Pursuant to Patent Rules 3-3 and 3-4 (b)" In the United States District Court for the Eastern District of Texas, Tyler Division, SmartPhone Technologies, LLC v. HTC Corporation, HTC America, Inc., Sony Ericsson Mobile Communications AB, Sony Ericsson Mobile Communications (USA), Inc., and T-Mobile USA, Inc., Civil Action No. 6:10-cv-580, filed Dec. 15, 2011, 79 pages.

Appendix A-1 re above #1: Claim Chart: Sainton U.S. 5,761,621 Invalidates Asserted Claims 17, 18, 20, 21, 22, and 24 of U.S. Patent No. 7,506,064, 15 pages.

Appendix A-2 re above #1: Claim Chart: "Dynamic Network Reconfiguration Support for Mobile Computers" Invalidates Asserted Claims 17, 18, 20, 21, and 24 of U.S. Patent No. 7,506,064, 15 pages.

Appendix A-3 re above #1: Claim Chart: WindowsNT Invalidates Asserted Claim 17, 18, 20, 22 and 24 of U.S. Patent No. 7,506,064, 11 pages.

Appendix A-4 re above #1: Claim Chart: Seppanen U.S. 5,903,832 Invalidates Asserted Claims 17, 18, 20, 21, and 24 of U.S. Patent No. 7,506,064, 9 pages.

Appendix A-5 re above #1: Claim Chart: Lunsford U.S. 6,982,962 Invalidates Asserted Claims 17, 18, 20, 21, 23, and 24 of U.S. Patent No. 7,506,064, 11 pages.

Appendix A-6 re above #1: Claim Chart: Clark U.S. 5,666,530 Invalidates Asserted Claims 17, 18, 20, 21, 23, and 24 of U.S. Patent No. 7,506,064, 11 pages.

Appendix A-7 re above #1: Claim Chart: Sanyo SCP-400 Invalidates Asserted Claims 17, 18, 20, 21, 23 and 24 of U.S. Patent No. 7,506,064, 26 pages.

Appendix A-8 re above #1: Claim Chart: Sprint PCS Touchpoint Invalidates Asserted Claims 17, 18, 20, 21, 23 and 24 of U.S. Patent No. 7,506,064, 33 pages.

Appendix A-9 re above #1: Claim Chart: Kukkohovi U.S. Patent No. 6,119,003 Invalidates Asserted Claims 17, 18, 20, 21 and 24 of U.S. Patent No. 7,506,064, 10 pages.

Appendix A-10 re above #1: Claim Chart: Heeren U.S. Patent No. 6,311,288 Invalidates Asserted Claims 17, 18, and 20 of U.S. Patent No. 7,506,064, 12 pages.

Appendix A-11 re above #1: Claim Chart: Ayyagari U.S. Patent No. 7,120,129 Invalidates Asserted Claims 17, 18, 20, 22, 23 and 24 of U.S. Patent No. 7,506,064, 14 pages.

Appendix A-12 re above #1: Claim Chart: Bremer U.S. Patent No. 6,018,671 Invalidates Asserted Claims 1, 2, and 5 of U.S. Patent No. 7,076,275, 10 pages.

Appendix A-13 re above #1: Claim Chart: Nokia 9000 Communicator Invalidates Asserted Claims 1, 2, and 5 of U.S. Patent No. 7,076,275, 29 pages.

Appendix A-14 re above #1: Claim Chart: QUALCOMM pdQ™ Smartphone Invalidates Asserted Claims 1, 2, and 5 of U.S. Patent No. 7,076,275, 14 pages.

Appendix A-15 re above #1: Claim Chart: Alcatel OT Com Invalidates Asserted Claims 1, 2, and 5 of U.S. Patent No. 7,076,275, 10 pages.

Appendix A-16 re above #1: Claim Chart: AT&T EO Personal Communicator Invalidates Asserted Claims 1, 2, and 5 of U.S. Patent No. 7,076,275, 16 pages.

Appendix A-17 re above #1: Claim Chart: Beaton U.S. Patent No. 6,608,637 Invalidates Asserted Claims 1, 2, and 5 of U.S. Patent No. 7,076,275, 21 pages.

Appendix A-18 re above #1: Claim Chart: Bjorn U.S. Patent No. 6,714,222 Invalidates Asserted Claims 1, 2, and 5 of U.S. Patent No. 7,076,275, 8 pages.

Appendix A-19 re above #1: Claim Chart: Borland U.S. Patent No. 6,320,943 Invalidates Asserted Claims 1, 2, and 5 of U.S. Patent No. 7,076,275, 8 pages.

Appendix A-20 re above #1: Claim Chart: The DataRover 840 with General Magic's Magic Cap Operating System Invalidates Asserted Claims 1, 2, and 5 of U.S. Patent No. 7,076,275, 25 pages.
Appendix A-21 re above #1: Claim Chart: Ericsson R380s User Manual and Demonstration Invalidates Asserted Claims 1, 2, and 5 of U.S. Patent No. 7,076,275, 69 pages.
Appendix A-22 re above #1: Claim Chart: IBM Simon Personal Communicator Invalidates Asserted Claims 1, 2, and 5 of U.S. Patent No. 7,076,275, 14 pages.
Appendix A-23 re above #1: Claim Chart: JTAPI 1.3 Invalidates Asserted Claims 1, 2, and 5 of U.S. Patent No. 7,076,275, 25 pages.
Appendix A-24 re above #1: Claim Chart: Nokia 9000i1 Communicator Invalidates Asserted Claims 1, 2, and 5 of U.S. Patent No. 7,076,275, 18 pages.
Appendix A-25 re above #1: Claim Chart: Nortel Orbitor Invalidates Asserted Claims 1, 2, and 5 of U.S. Patent No. 7,076,275, 9 pages.
Appendix A-26 re above #1: Claim Chart: Schnarel U.S. Patent No. 6,389,124 Invalidates Asserted Claims 1, and 5 of U.S. Patent No. 7,076,275, 14 pages.
Appendix A-27 re above #1: Claim Chart: Sony Magic Link Invalidates Asserted Claims 1, 2, and 5 of U.S. Patent No. 7,076,275, 13 pages.
Appendix A-28 re above #1: Claim Chart: Wolff U.S. Patent No. 5,327,486 Invalidates Asserted Claims 1, 2, and 5 of U.S. Patent No. 7,076,275, 8 pages.
Appendix A-29 re above #1: Claim Chart: Nokia 9000i Communicator Invalidates Asserted Claims 1, 2, and 5 of U.S. Patent No. 7,076,275, 15 pages.
Appendix A-30 re above #1: Claim Chart: Nokia 9110 Communicator Invalidates Asserted Claims 1, 2 and 5 of U.S. Patent No. 7,076,275, 14 pages.
Appendix A-31 re above #1: Claim Chart: Nokia 9110i Communicator Invalidates Asserted Claims 1, 2, and 5 of U.S. Patent No. 7,076,275, 16 pages.
Appendix A-32 re above #1: Claim Chart: AT&T EO Invalidates Asserted Claims 1 and 3 of U.S. Patent No. 7,533,342, 38 pages.
Appendix A-33 re above #1: Claim Chart: Ericsson R380sc Invalidates Asserted Claims 1-3, 5-6, and 8-12 of U.S. Patent No. 7,533,342, 16 pages.
Appendix A-34 re above #1: Claim Chart: Motorola Envoy Invalidates Asserted Claims 1-3 and 5 of U.S. Patent No. 7,533,342, 33 pages.
Appendix A-35 re above #1: Claim Chart: Motorola v8162 Invalidates Asserted Claims 1-3, and 5 of U.S. Patent No. 7,533,342, 9 pages.
Appendix A-36 re above #1: Claim Chart: Qualcomm pdQ Invalidates Asserted Claims 1-3, 5-6, and 8-12 of U.S. Patent No. 7,533,342, 8 pages.
Appendix A-37 re above #1: Claim Chart: Samsung SCH-850 Invalidates Asserted Claims 1-3, and 5 of U.S. Patent No. 7,533,342, 8 pages.
Appendix A-38 re above #1: Claim Chart: the Sony Magic Link Invalidates Asserted Claims 1-3, 5-6, and 8-12 of U.S. Patent No. 7,533,342, 60 pages.
Appendix A-39 re above #1: Claim Chart: Benefon Twin Invalidates Asserted Claims 1-3, and 5 of U.S. Patent No. 7,533,342, 13 pages.
Appendix A-40 re above #1: Claim Chart: IBM/BellSouth Simon and/or Its Users Manual Invalidates Asserted Claims 1, 3, 5-6, and 8-12 of U.S. Patent No. 7,533,342, 16 pages.
Appendix A-41 re above #1: Claim Chart: Motorola P8160 Invalidates Asserted Claims 1-3 and 5 of U.S. Patent No. 7,533,342, 10 pages.
Appendix A-42 re above #1: Claim Chart: Motorola P8167 and/or Its User Guide Invalidates Asserted Claims 1-3, and 5 of U.S. Patent No. 7,533,342, 9 pages.
Appendix A-43 re above #1: Claim Chart: Motorola SC3160 Invalidates Asserted Claims 1-3, and 5 of U.S. Patent No. 7,533,342, 10 pages.
Appendix A-44 re above #1: Claim Chart: Nokia 2110 and/or Its User Guide Invalidates Asserted Claims 1-3, and 5 of U.S. Patent No. 7,533,342, 8 pages.
Appendix A-45 re above #1: Claim Chart: Nokia 9000i and/or Its User Guide Invalidates Asserted Claims 1-3, 5-6, and 12 of U.S. Patent No. 7,533,342, 9 pages.
Appendix A-46 re above #1: Claim Chart: Nokia 9110 and/or Its User Guide Invalidates Asserted Claims 1-3, and 5 of U.S. Patent No. 7,533,342, 9 pages.
Appendix A-47 re above #1: Claim Chart: Nokia 9110i and/or Its User Guide Invalidates Asserted Claims 1-3, and 5 of U.S. Patent No. 7,533,342, 8 pages.
Appendix A-48 re above #1: Claim Chart: Samsung SCH-M100 and/or Its User Guide Invalidates Asserted Claims 1-3, 5-6, and 8-12 of U.S. Patent No. 7,533,342, 16 pages.
Appendix A-49 re above #1: Claim Chart: Samsung SCH-8500 and/or Its User Guide Invalidates Asserted Claims 1-3, and 5-6 of U.S. Patent No. 7,533,342, 8 pages.
Appendix A-50 re above #1: Claim Chart: Samsung SPH-M2100 and/or Its User Guide Invalidates Asserted Claims 1-3, and 5 of U.S. Patent No. 7,533,342, 11 pages.
Appendix A-51 re above #1: Claim Chart: Sanyo SCP-4000 Invalidates Asserted Claims 1-3, and 5 of U.S. Patent No. 7,533,342, 11 pages.
Appendix A-52 re above #1: Claim Chart: Sprint Touchpoint Invalidates Asserted Claims 1-3, and 5-6 of U.S. Patent No. 7,533,342, 12 pages.
Appendix A-53 re above #1: Claim Chart: Nokia 9000 and/or Its User Guide Invalidates Asserted Claims 1-3, 5-7, and 12 of U.S. Patent No. 7,533,342, 9 pages.
Appendix A-54 re above #1: Claim Chart: Alanara U.S. 6,188,909 Invalidates Asserted Claim 1 of U.S. Patent No. Re 40,459, 10 pages.
Appendix A-55 re above #1: Claim Chart: Apple Newton MessagePad 120 Invalidates Asserted Claim 1 of U.S. Patent No. Re 40,459, 13 pages.
Appendix A-56 re above #1: Claim Chart: HP 200LX Invalidates Asserted Claim 1 of U.S. Patent No. Re 40,459, 11 pages.
Appendix A-57 re above #1: Claim Chart: Kari et al. US 6,154,745 Invalidates Asserted Claim 1 of U.S. Patent No. Re 40,459, 14 pages.
Appendix A-58 re above #1: Claim Chart: Magic Link PIC-1000 Invalidates Asserted Claim 1 of U.S. Patent No. Re 40,459, 13 pages.
Appendix A-59 re above #1: Claim Chart: MarketClip Invalidates Asserted Claim 1 of U.S. Patent No. Re 40,459, 9 pages.
Appendix A-60 re above #1: Claim Chart: Motorola Marco and McKeehan Invalidate Asserted Claim 1 of U.S. Patent No. Re 40,459, 7 pages.
Appendix A-61 re above #1: Claim Chart: Microsoft Windows CE — The Handheld PC Companion Invalidates Asserted Claim 1 of U.S. Patent No. Re 40,459, 4 pages.
Appendix A-62 re above #1: Claim Chart: Motorola Envoy Invalidates Asserted Claim 1 of U.S. Patent No. Re 40,459, 16 pages.
Appendix A-63 re above #1: Claim Chart: Apple Newton 2100 running NetHopper 3.2 Invalidates Asserted Claim 1 of U.S. Patent No. Re 40,459, 13 pages.
Appendix A-64 re above #1: Claim Chart: Nguyen, et al. U.S. 5,737,592 Invalidates Asserted Claim 1 of U.S. Patent No. Re 40,459, 9 pages.
Appendix A-65 re above #1: Claim Chart: Nokia 9000i Communicator Invalidates Asserted Claim 1 of U.S. Patent No. Re 40,459, 6 pages.
Appendix A-66 re above #1: Claim Chart: RemoteWare Invalidates Asserted Claim 1 of U.S. Patent No. Re 40,459, 10 pages.
Appendix A-67 re above #1: Claim Chart: Rossman EP 0 779 759 A2 Invalidates Asserted Claim 1 of U.S. Patent No. Re 40,459, 8 pages.
Appendix A-68 re above #1: Claim Chart: Simmon et al. U.S. 5,867,688 Invalidates Asserted Claim 1 of U.S. Patent No. Re 40,459, 15 pages.
Appendix A-69 re above #1: Claim Chart: Thompson U.S. 5,465,401 Invalidates Asserted Claim 1 of U.S. Patent No. Re 40,459, 12 pages.
Appendix A-70 re above #1: Claim Chart: UP.Link Invalidates Asserted Claim 1 of U.S. Patent No. Re 40,459, 18 pages.
Appendix A-71 re above #1: Claim Chart: WebExpress Invalidates Asserted Claims 1, 17, and 18 of U.S. Patent No. Re 40,459, 10 pages.
Appendix A-72 re above #1: Claim Chart: Yamamoto et al. WO 97/14244 Invalidates Asserted Claim 1 of U.S. Patent No. Re 40,459, 9 pages.

Appendix A-73 re above #1: Claim Chart: Ball U.S. 6,222,847 Invalidates Asserted Claim 1 of U.S. Patent No. Re 40,459, 7 pages.
Appendix A-74 re above #1: Claim Chart: Akamine et al. PH 05-298373 Invalidates Asserted Claim 1 of U.S. Patent No. Re 40,459, 19 pages.
Appendix A-75 re above #1: Claim Chart: Mizuguchi et al. PH 09-257501 Invalidates Asserted Claim 1 of U.S. Patent No. Re 40,459, 22 pages.
Appendix A-76 re above #1: Claim Chart: Ketola U.S. 6,112,099 Invalidates Asserted Claim 1 of U.S. Patent No. Re 40,459, 11 pages.
Appendix A-77 re above #1: Claim Chart: Liao, U.S. 6,263,437, Invalidates Asserted Claim 1 of U.S. Patent No. Re 40,459, 10 pages.
Appendix A-78 re above #1: Claim Chart: Narayanaswami U.S. 6,672,775 Invalidates Asserted Claim 1 of U.S. Patent No. Re 40,459, 10 pages.
Appendix A-79 re above #1: Claim Chart: Nokia 9000 Invalidates Asserted Claim 1 of U.S. Patent No. Re 40,459, 7 pages.
Appendix A-80 re above #1: Claim Chart: Nokia 9000 Invalidates Asserted Claim 1 of U.S. Patent No. Re 40,459, 9 pages.
Appendix A-81 re above #1: Claim Chart: Rossman U.S. 5,809,415 Invalidates Asserted Claim 1 of U.S. Patent No. Re 40,459, 9 page.
Appendix A-82 re above #1: Claim Chart: Handheld Device Markup Language Specification Invalidates Asserted Claims 1, 17, and 18 of U.S. Patent No. Re 40,459, 3 pages.
Appendix A-83 re above #1: Claim Chart: Apple iBook Computer with AirPort Card Invalidates Asserted Claims 18, 19, 20, and 26 of U.S. Patent No. 6,950,645, 29 pages.
Appendix A-84 re above #1: Claim Chart: ANSI/IEEE Standard 802.11 (1999) Invalidates Asserted Claims 18, 19, 20, and 26 of U.S. Patent No. 6,950,645, 13 pages.
Appendix A-85 re above #1: Claim Chart: Ghisler U.S. Patent No. 5,541,976 Invalidates Asserted Claims 18, 19, 20, and 26 of U.S. Patent No. 6,950,645, 11 pages.
Appendix A-86 re above #1: Claim Chart: Heiman U.S. Patent No. 6,002,918 Invalidates Asserted Claims 18, 19, 20, and 26 of U.S. Patent No. 6,950,645, 8 pages.
Appendix A-87 re above #1: Claim Chart: Larsson U.S. Patent No. 6,697,638 Invalidates Asserted Claims 18, 19, 20, and 26 of U.S. Patent No. 6,950,645, 9 pages.
Appendix A-88 re above #1: Claim Chart: Novakov U.S. Patent No. 6,571,103 Invalidates Asserted Claims 18, 19, 20, and 26 of U.S. Patent No. 6,950,645, 16 pages.
Appendix A-89 re above #1: Claim Chart: Salkintzis "An In-Band Power-Saving Protocol for Mobile Data Networks" Invalidates Asserted Claims 18, 19, 20, and 26 of U.S. Patent No. 6,950,645, 9 pages.
Appendix A-90 re above #1: Claim Chart: Microsoft WinInet Invalidates Asserted Claims 1, 2, 6, and 7 of U.S. Patent No. 7,693,949, 15 pages.
Appendix A-91 re above #1: Claim Chart: "MSOCKS: An Architecture for Transport Layer Mobility" Invalidates Asserted Claims 1, 2, 6, and 7 of U.S. Patent No. 7,693,949, 25 pages.
Appendix A-92 re above #1: Claim Chart: The Palm OS Computing Platform Invalidates Asserted Claims 1, 2, 6, and 7 of U.S. Patent No. 7,693,949, 23 pages.
Appendix A-93 re above #1: Claim Chart: the MIT Rover System Invalidates Asserted Claims 1, 2, 6, and 7 of U.S. Patent No. 7,693,949, 20 pages.
Appendix A-94 re above #1: Claim Chart: the IBM WebExpress System Invalidates Asserted Claims 1, 2, 6, and 7 of U.S. Patent No. 7,693,949, 15 pages.
Appendix A-95 re above #1: Claim Chart: Firth U.S. Patent No. 5,987,517 Invalidates Asserted Claims 1, 2, 6, and 7 of U.S. Patent No. 7,693,949, 22 pages.
Appendix A-96 re above #1: Claim Chart: Joseph U.S. Patent No. 6,038,603 Invalidates Asserted Claims 1, 2, 6, and 7 of U.S. Patent No. 7,693,949, 15 pages.
Appendix A-97 re above #1: Claim Chart: Miller U.S. Patent No. 6,192,410 Invalidates Asserted Claims 1, 2, 6, and 7 of U.S. Patent No. 7,693,949, 15 pages.
Appendix A-98 re above #1: Claim Chart: Discolo U.S. Patent No. 6,370,566 Invalidates Asserted Claims 1, 2, 6, and 7 of U.S. Patent No. 7,693,949, 13 pages.
Appendix A-99 re above #1: Claim Chart: Peacock U.S. Patent No. 6,601,111 Invalidates Asserted Claims 1, 2, 6, and 7 of U.S. Patent No. 7,693,949, 15 pages.
Appendix A-100 re above #1: Claim Chart: Davis U.S. Patent No. 6,976,262 Invalidates Asserted Claims 1, 2, 6, and 7 of U.S. Patent No. 7,693,949, 14 pages.
Appendix A-101 re above #1: Claim Chart: Martin U.S. Patent No. 7,010,603 Invalidates Asserted Claims 1, 2, 6, and 7 of U.S. Patent No. 7,693,949, 15 pages.
Appendix A-102 re above #1: Claim Chart: Venkatraman U.S. Patent No. 5,956,487 invalidates claim 3 of U.S. Patent No. 6,317,781, 17 pages.
Appendix A-103 re above #1: Claim Chart: HTML 3.2 Reference Specification invalidates claim 3 of U.S. Patent No. 6,317,781, 12 pages.
Appendix A-104 re above #1: Claim Chart: Rossman U.S. Patent No. 6,405,037 invalidates claim 3 of U.S. Patent No. 6,317,781, 12 pages.
Appendix A-105 re above #1: Claim Chart: Tarpenning U.S. Patent No. 6,181,344 invalidates claim 3 of U.S. Patent No. 6,317,781, 5 pages.
Appendix A-106 re above #1: Claim Chart: Bertram U.S. Patent No. 6,011,546 invalidates claim 3 of U.S. Patent No. 6,317,781, 9 pages.
Appendix A-107 re above #1: Claim Chart: Bertram U.S. Patent No. 6,073,136 invalidates claim 3 of U.S. Patent No. 6,317,781, 7 pages.
Appendix A-108 re above #1: Claim Chart: Schwartz U.S. Patent No. 6,473,609 invalidates claim 3 of U.S. Patent No. 6,317,781, 11 pages.
Appendix A-109 re above #1: Claim Chart: Herrod U.S. Patent No. 6,405,049 invalidates claim 3 of U.S. Patent No. 6,317,781, 8 pages.
Appendix A-110 re above #1: Claim Chart: Wecker U.S. Patent No. 6,449,638 invalidates claim 3 of U.S. Patent No. 6,317,781, 12 pages.
Appendix A-111 re above #1: Claim Chart: Rowe U.S. Patent No. 5,964,836 invalidates claim 3 of U.S. Patent No. 6,317,781, 10 pages.
Appendix A-112 re above #1: Claim Chart: Venkatraman U.S. Patent No. 6,139,177 invalidates claim 3 of U.S. Patent No. 6,317,781, 14 pages.
Appendix A-113 re above #1: Claim Chart: Zeanah U.S. Patent No. 5,933,816 invalidates claim 3 of U.S. Patent No. 6,317,781, 11 pages.
Appendix A-114 re above #1: Claim Chart: Berners-Lee 1992 invalidates claim 3 of U.S. Patent No. 6,317,781, 10 pages.
Appendix A-115 re above #1: Claim Chart: Berners-Lee 1994 invalidates claim 3 of U.S. Patent No. 6,317,781, 8 pages.
Appendix A-116 re above #1: Claim Chart: Cisco IOS Software version 11.0(6) invalidates claim 3 of U.S. Patent No. 6,317,781, 13 pages.
Appendix A-117 re above #1: Claim Chart: URLs for Telephony invalidates claim 3 of U.S. Patent No. 6,317,781, 8 pages.
Appendix A-118 re above #1: Claim Chart: Schwartz U.S. Patent No. 6,473,609 invalidates claim 14 of U.S. Patent No. 6,470,381, 11 pages.
Appendix A-119 re above #1: Claim Chart: Herrod U.S. Patent No. 6,405,049 invalidates claim 14 of U.S. Patent No. 6,470,381, 8 pages.
Appendix A-120 re above #1: Claim Chart: Rowe U.S. Patent No. 5,964,836 invalidates claim 14 of U.S. Patent No. 6,470,381, 10 pages.
Appendix A-121 re above #1: Claim Chart: Venkatraman U.S. Patent No. 6,139,177 invalidates claim 14 of U.S. Patent No. 6,470,381, 14 pages.
Appendix A-122 re above #1: Claim Chart: U.S. Patent No. 5,933,816 invalidates claim 14 of U.S. Patent No. 6,470,381, 11 pages.
Appendix A-123 re above #1: Claim Chart: Venkatraman U.S. Patent No. 5,956,487 invalidates claim 14 of U.S. Patent No. 6,470,381, 15 pages.
Appendix A-124 re above #1: Claim Chart: Wecker U.S. Patent No. 6,449,638 invalidates claim 14 of U.S. Patent No. 6,470,381, 12 pages.
Appendix A-125 re above #1: Claim Chart: Rossman U.S. Patent No. 6,405,037 invalidates claim 14 of U.S. Patent No. 6,470,381, 12 pages.
Appendix A-126 re above #1: Claim Chart: Tarpenning U.S. Patent No. 6,181,344 invalidates claim 14 of U.S. Patent No. 6,470,381, 5 pages.

Appendix A-127 re above #1: Claim Chart: Bertram U.S. Patent No. 6,011,546 invalidates claim 14 of U.S. Patent No. 6,470,381, 9 pages.
Appendix A-128 re above #1: Claim Chart: Bertram U.S. Patent No. 6,073,136 invalidates claim 14 of U.S. Patent No. 6,470,381, 7 pages.
Appendix A-129 re above #1: Claim Chart: HTML 3.2 Reference Specification invalidates claim 14 of U.S. Patent No. 6,470,381, 12 pages.
Appendix A-130 re above #1: Claim Chart: Berners-Lee 1994 invalidates claim 14 of U.S. Patent No. 6,470,381, 10 pages.
Appendix A-131 re above #1: Claim Chart: Berners-Lee 1994 invalidates claim 14 of U.S. Patent No. 6,470,381, 8 pages.
Appendix A-132 re above #1: Claim Chart: Cisco IOS Software version 11.0(6) invalidates claim 3 of U.S. Patent No. 6,470,381, 12 pages.
Appendix A-133 re above #1: Claim Chart: URLs for Telephony invalidates claim 14 of U.S. Patent No. 6,470,381, 8 pages.
Appendix A-134 re above #1: Claim Chart: Crozier U.S. 5,701,423 Invalidates Asserted Claims 22, 25, and 30 of U.S. Patent No. 6,760,728, 10 pages.
Appendix A-135 re above #1: Claim Chart: Alley et al. U.S. 5,845,282 Invalidates Asserted Claims 22, 25, and 30 of U.S. Patent No. 6,760,728, 11 pages.
Appendix A-136 re above #1: Claim Chart: Narurkar U.S. 6,339,795 Invalidates Asserted Claims 22, 25, and 30 of U.S. Patent No. 6,760,728, 10 pages.
Appendix B-1 re above #1: Claim Chart: Supplemental References Invalidate Asserted Claims 17, 18, 20, 21, 23, and 24 of U.S. Patent No. 7,506,064, 23 pages.
Appendix B-2 re above #1: Claim Chart: Nokia 9000 Communicator and Bremer U.S. Patent No. 6,018,671 Invalidate Asserted Claims 1, 2, and 5 of U.S. Patent No. 7,076,275, 24 pages.
Appendix B-3 re above #1: Claim Chart: Nokia 9000 Communicator and QUALCOMM pdQ™ Smartphone Invalidate Asserted Claims 1, 2, and 5 of U.S. Patent No. 7,076,275, 25 pages.
Appendix B-4 re above #1: Claim Chart: Nokia 9000 Communicator, QUALCOMM pdQ™ Smartphone, and Bremer U.S. Patent No. 6,018,671 Invalidate Asserted Claims 1, 2, and 5 of U.S. Patent No. 7,076,275, 30 pages.
Appendix B-5 re above #1: Claim Chart: Qualcomm pdQTM Smartphone and Bremer U.S. Patent No. 6,018,671 Invalidate Asserted Claims 1, 2, and 5 of U.S. Patent No. 7,076,275, 19 pages.
Appendix B-6 re above #1: Claim Chart: Supplemental References Invalidate Asserted Claims 1, 2 and 5 of U.S. Patent No. 7,076,275, 38 pages.
Appendix B-7 re above #1: Claim Chart: Thompson U.S. 5,465,401 Invalidates Asserted Claims 1, 6, and 8-12 of U.S. Patent No. 7,533,342, 38 pages.
Appendix B-8 re above #1: Claim Chart: Nortel PCS 1930 Renders Obvious Claims 1-3, 5-6, and 8-12 of U.S. Patent No. 7,533,342, 80 pages.
Appendix B-9 re above #1: Claim Chart: IBM/BellSouth Simon and/or Its Users Manual Renders Obvious Asserted Claims 1-3, 5-6, and 8-12 of U.S. Patent No. 7,533,342, 43 pages.
Appendix B-10 re above #1: Claim Chart: Samsung SCH-8500 and/or Its User Guide Renders Obvious Asserted Claims 1-3, 5-6, and 8-12 of U.S. Patent No. 7,533,342, 46 pages.
Appendix B-11 re above #1: Claim Chart: Samsung SPH-M2100 and/or Its User Guide Renders Obvious Asserted Claims 1-3, 5-6, and 8-12 of U.S. Patent No. 7,533,342, 55 pages.
Appendix B-12 re above #1: Claim Chart: Claims 1-3, 5-6, and 8-12 of U.S. Patent No. 7,533,342, 31 pages.
Appendix B-13 re above #1: Claim Chart: Supplemental References Invalidate Asserted Claim 1 of U.S. Patent No. Re 40,459, 35 pages.
Appendix B-14 re above #1: Claim Chart: Supplemental References Invalidate Asserted Claims 18, 19, 20, and 26 of U.S. Patent No. 6,950,645, 36 pages.
Appendix B-15 re above #1: Claim Chart: Supplemental References Invalidate Asserted Claims 18, 19, 20, and 26 of U.S. Patent No. 6,950,645, 11 pages.
Appendix B-16 re above #1: Claim Chart: Alley 5,845,282 and Corzie 5,701,423 Invalidate Asserted Claims 22, 25, and 30 of U.S. Patent No. 6,760,728, 14 pages.
Appendix B-17 re above #1: Claim Chart: Alley 5,845,282 and Narurkar 6,339,795 Invalidate Asserted Claims 22, 25, and 30 of U.S. Patent No. 6,760,728, 15 pages.
Appendix B-18 re above #1: Claim Chart: Victor U.S. 5,640,566, Newton Connection 2.0 Update, and Newton Programmer's Guide Invalidates Asserted Claims 22, 25, and 30 of U.S. Patent No. 6,760,728, 12 pages.
Appendix B-19 re above #1: Claim Chart: Victor U.S. 5,640,566, Newton Connection 2.0 Update, Newton Programmer's Guide, and Narurkar U.S. 6,339,795 Invalidates Asserted Claims 22, 25, and 30 of U.S. Patent No. 6,760,728, 21 pages.
Appendix B-20 re above #1: Claim Chart: Victor U.S. 5,640,566, Newton Connection 2.0 Update, Newton Programmer's Guide, and Crozier U.S. 5,701,423 Invalidates Asserted Claims 22, 25, and 30 of U.S. Patent No. 6,760,728, 22 pages.
Appendix B-21 re above #1: Claim Chart: The MIT Rover System Invalidates Asserted Claims 1, 2, 6, and 7 of U.S. Patent No. 7,693,949, 13 pages.
Appendix B-22 re above #1: Claim Chart: The MIT Rover System Invalidates Asserted Claims 1, 2, 6, and 7 of U.S. Patent No. 7,693,949 the Palm OS Computing Platform Invalidates Asserted Claims 1, 2, 6, and 7 of U.S. Patent No. 7,693,949, 22 pages.
Appendix B-23 re above #1: Claim Chart: U.S. Patent No. 5,956,487 and HTML 3.2 Reference Specification invalidate claim 3 of U.S. Patent No. 6,317,781, 25 pages.
Appendix B-24 re above #1: Claim Chart: U.S. Patent No. 6,139,177 and HTML 3.2 Reference Specification invalidate claim 3 of U.S. Patent No. 6,317,781, 22 pages.
Appendix B-25 re above #1: Claim Chart: U.S. Patent No. 5,956,487 and HTML 3.2 Reference Specification invalidate claim 14 of U.S. Patent No. 6,470,381, 25 pages.
Appendix B-26 re above #1: Claim Chart: U.S. Patent No. 6,139,177 and HTML 3.2 Reference Specification invalidate claim 14 of U.S. Patent No. 6,470,381, 22 pages.
"Defendants HTC Corporation and HTC America, Inc.'s Supplemental Preliminary Invalidity Contentions" In the United States District Court for the Eastern District of Texas, Tyler Division, SmartPhone Technologies, LLC v. HTC Corporation, HTC America, Inc., Civil Action No. 6:10-cv580, filed Oct. 29, 2012, 7 pages.
Supplemental Appendix 1-A re above #164: Claim Chart: The Bluetooth Specification Invalidates Claims 18 and 26 of U.S. Patent No. 6,950,645, 17 pages.
Supplemental Appendix 2-A re above #164: Claim Chart: The Digital Ocean Seahorse Invalidates Asserted Claims 1 and 2 of U.S. Patent No. 7,076,275, 12 pages.
Supplemental Appendix 2-B re above #164: Claim Chart: Schnarel U.S. Patent No. 6,389,124 in Combination With the Nokia 9000 Communicator Invalidates Claims 1 and 2 of U.S. Patent No. 7,076,275, 42 pages.
Supplemental Appendix 2-C re above #164: Claim Chart: Schnarel U.S. Patent No. 6,389,124 in Combination With the AT&T EO Communicator Invalidates Claims 1 and 2 of U.S. Patent No. 7,076,275, 27 pages.
Supplemental Appendix 3-A re above #164: Claim Chart: The Apple iBook Invalidates Claims 17 and 23 of U.S. Patent No. 7,506,064, 5 pages.
Supplemental Appendix 3-B re above #164: Claim Chart: Britton et al. US 5,425,028 Invalidates Claims 17 and 23 of U.S. Patent No. 7,506,064, 15 pages.
Supplemental Appendix 3-C re above #164: Claim Chart: The OpenLinux 2.3 Getting Started Guide Invalidates Claims 17 and 23 of U.S. Patent No. 7,506,064, 3 pages.
Supplemental Appendix 4-A re above #164: Claim Chart: Apple Newton MessagePad and McKeehan Invalidates Claims 1, 17 and 18 of U.S. Patent No. RE40,459, 30 pages.
Supplemental Appendix 4-B re above #164: Claim Chart: Apple Newton Running Newt's Weather Invalidates Asserted Claims 1, 17 and 18 of U.S. Patent No. RE40,459, 13 pages.
Supplemental Appendix 4-C re above #164: Claim Chart: de la Huerga US 5,960,085 Invalidates Claims 1, 17 and 18 of U.S. Patent No. Re 40,459, 31 pages.

Supplemental Appendix 4-D re above #164: Claim Chart: DeLorme et al. US 5,948,040 Invalidates Claims 1, 17 and 18 of U.S. Patent No. Re 40,459, 33 pages.
Supplemental Appendix 4-E re above #164: Claim Chart: Evans US 5,924,074 Invalidates Claims 1, 17 and 18 of U.S. Patent No. Re 40,459, 46 pages.
Supplemental Appendix 4-F re above #164: Claim Chart: Borovoy et al. US 5,842,009 Invalidates Claims 1, 17 and 18 of U.S. Patent No. Re 40,459, 32 pages.
Supplemental Appendix 4-G re above #164: Claim Chart: De Boor et al. US 6,173,316 Invalidates Claims 1, 17 and 18 of U.S. Patent No. Re 40,459, 30 pages.
Supplemental Appendix 4-H re above #164: Claim Chart: Obradovich et al. US 6,148,261 Invalidates Claims 1, 17 and 18 of U.S. Patent No. Re 40,459, 24 pages.
Supplemental Appendix 4-I re above #164: Claim Chart: O'Hagan et al. US 5,821,512 Invalidates Claims 1, 17 and 18 of U.S. Patent No. Re 40,459, 23 pages.
Supplemental Appendix 5-A re above #164: Claim Chart: the Apple Newton in/Out Box Invalidates Asserted Claim 1 of U.S. Patent No. 7,693,949, 18 pages.
Supplemental Appendix 5-B re above #164: Claim Chart: U.S. Patent No. 5,790,800 (Gauvin) Invalidates Asserted Claim 1 of U.S. Patent No. 7,693,949, 10 pages.
Supplemental Appendix 5-C re above #164: Claim Chart: U.S. Patent No. 6,405,037 Invalidates Asserted Claim 1 of U.S. Patent No. 7,693,949, 7 pages.
Supplemental Appendix 5-D re above #164: Claim Chart: U.S. Patent No. 5,473,608 (Gagne et al.) Invalidates Asserted Claim 1 of U.S. Patent No. 7,693,949, 10 pages.
Supplemental Appendix 5-E re above #164: Claim Chart: Miller U.S. Patent No. 6,192,410 in Combination With a Laptop Computer Running Windows 95 Invalidates Asserted Claim 1 of U.S. Patent No. 7,693,949, 12 pages.
Supplemental Appendix 5-E re above #164: Claim Chart: Microsoft Winlnet Combined With U.S. Patent No. 5,987,517 ("Firth") Invalidates Asserted Claim 1 of U.S. Patent No. 7,693,949, 22 pages.
"Defendants HTC Corporation and HTC America, Inc.'s Second Supplemental Preliminary Invalidity Contentions" in the United States District Court for the Eastern District of Texas, Tyler Division, SmartPhone Technologies, LLC v. HTC Corporation, HTC America, Inc., Civil Action No. 6:10-cv-580, filed Nov. 14, 2012, 6 pages.
Second Supplemental Appendix A-1 re above #187: Claim Chart: U.S. Patent No. 6,309,305 Invalidates Asserted Claims 22, 25, and 30 of U.S. Patent No. 6,760,728, 24 pages.
Second Supplemental Appendix A-2 re above #187: Claim Chart: U.S. Patent No. 6,309,305 in Combination With Microsoft Outlook 98 Invalidates Asserted Claims 22, 25, and 30 of U.S. Patent No. 6,760,728, 26 pages.
Second Supplemental Appendix A-3 re above #187: Claim Chart: U.S. Patent No. 6,128,620 Invalidates Asserted Claims 22 and 25 of U.S. Patent No. 6,760,728, 14 pages.
Second Supplemental Appendix A-4 re above #187: Claim Chart: U.S. Patent No. 6,604,079 Invalidates Asserted Claims 22 and 30 of U.S. Patent No. 6,760,728, 15 pages.
"Defendants AT&T Mobility LLC, HTC Corporation and HTC America, Inc.'s Invalidity Contentions and Production of Documents" in the United States District Court for the Eastern District of Texas, Tyler Division, SmartPhone Technologies, LLC vs. AT&T Inc., et al, Civil Action No. 6:11-cv-561, filed June. 15, 2012, 36 pages.
Appendix A-1 re above #192: Claim Chart: US Patent No. 5,537,608 ("Beatty, et al.") Invalidates Asserted Claims 1, 4 and 5 of U.S. Patent No. 6,976,217, 28 pages.
Appendix A-2 re above #192: Claim Chart: US Patent No. 5,606,594 ("Register, et al.") Invalidates Asserted Claims 1, 4, 5, 6, 7 and 8 of U.S. Patent No. 6,976,217, 41 pages.
Appendix A-3 re above #192: Claim Chart: US Patent No. 6,516,202 ("Hawkins, et al.") Invalidates Asserted Claims 1, 4, 5, 6, 7 and 8 of U.S. Patent No. 6,976,217, 26 pages.
Appendix A-4 re above #192: Claim Chart: U.S. Patent No. 6,608,637 ("Beaton") Invalidates Asserted Claims 1, 4, 5, 6, 7 and 8 of U.S. Patent No. 6,976,217, 21 pages.

Appendix A-5 re above #192: Claim Chart: U.S. Patent No. 6,781,575 ("Hawkins, et al.") Invalidates Asserted Claims 1, 4, 5, 6, 7 and 8 of U.S. Patent No. 6,976,217, 10 pages.
Appendix A-6 re above #192: Claim Chart: U.S. Patent No. 7,603,139 ("Tom") Invalidates Asserted Claims 1, 4, 5, 6, 7 and 8 of U.S. Patent No. 6,976,217, 36 pages.
Appendix A-7 re above #192: Claim Chart: Frid-Nielson U.S. Patent No. 5,519,606 Invalidates U.S. Patent No. 6,466,236, 11 pages.
Appendix A-8 re above #192: Claim Chart: Clark U.S. Patent No. 5,666,530 Invalidates U.S. Patent No. 6,466,236, 14 pages.
Appendix A-9 re above #192: Claim Chart: Frid-Nielson U.S. Patent No. 5,778,346 Invalidates U.S. Patent No. 6,466,236, 8 pages.
Appendix A-10 re above #192: Claim Chart: Brown U.S. Patent No. 5,923,552 Invalidates U.S. Patent No. 6,466,236, 11 pages.
Appendix A-11 re above #192: Claim Chart: Mansour U.S. Patent No. 6,035,278 Invalidates U.S. Patent No. 6,466,23, 11 pages.
Appendix A-12 re above #192: Claim Chart: Dean U.S. Patent No. 6,167,379 Invalidates U.S. Patent No. 6,466,236, 9 pages.
205 Appendix A-13 re above #192: Claim Chart: U.S. Patent No. 4,860,005 ("DeLuca, et al.") Invalidates Asserted Claims 1, 2, 9, 13, 14 and 20 of U.S. Patent No. 6,928,300, 40 pages.
Appendix A-14 re above #192: Claim Chart: U.S. Patent No. 5,337,346 ("Uchikura") Invalidates Asserted Claims 1, 2, 9, 13, 14 and 20 of U.S. Patent No. 6,928,300, 39 pages.
Appendix A-15 re above #192: Claim Chart: U.S. Patent No. 6,453,182 ("Sprigg, et al.") Invalidates Asserted Claims 1, 2, 9, 13, 14 and 20 of U.S. Patent No. 6,928,300, 17 pages.
Appendix A-16 re above #192: Claim Chart: U.S. Patent No. 6,459,360 ("Helferich") Invalidates Asserted Claims 1, 2, 9, 13, 14 and 20 of U.S. Patent No. 6,928,300, 21 pages.
Appendix A-17 re above #192: Claim Chart: U.S. Patent No. 6,690,940 ("Brown, et al.") Invalidates Asserted Claims 1, 2, 9, 13, 14 and 20 of U.S. Patent No. 6,928,300, 15 pages.
Appendix A-18 re above #192: Claim Chart: U.S. Patent No. 6,763,238 ("Okano") Invalidates Asserted Claims 1, 2, 9, 13, 14 and 20 of U.S. Patent No. 6,928,300, 17 pages.
Appendix A-19 re above #192: Claim Chart: The Nokia 9000i Communicator Invalidates Asserted Claims 1, 2, 9, 13, 14 and 20 of U.S. Patent No. 6,928,300, 28 pages.
Appendix A-20 re above #192: Claim Chart: The Nokia 9110 Communicator Invalidates Asserted Claims 1, 2, 9, 13, 14 and 20 of U.S. Patent No. 6,928,300, 27 pages.
Appendix A-21 re above #192: Claim Chart: Tannenbaum U.S. Patent no. 5,252,951 Invalidates U.S. Patent No. 6,956,562, 21 pages.
Appendix A-22 re above #192: Claim Chart: Gough U.S. Patent No. 5,603,053 Invalidates U.S. Patent No. 6,956,562, 24 pages.
Appendix A-23 re above #192: Claim Chart: Beernink U.S. Patent No. 5,612,719 Invalidates U.S. Patent No. 6,956,562, 36 pages.
Appendix A-24 re above #192: Claim Chart: Pisutha-Arnond U.S. Patent No. 5,745,116 Invalidates U.S. Patent No. 6,956,562, 31 pages.
Appendix A-25 re above #192: Claim Chart: Buxton U.S. Patent No. 6,094,197 Invalidates U.S. Patent No. 6,956,562, 35 pages.
Appendix A-26 re above #192: Claim Chart: Apple Newton MessagePad Handbook Invalidates U.S. Patent No. 6,956,562, 30 pages.
Appendix A-27 re above #192: Claim Chart: U.S. Patent No. 6,139,177 invalidates claims 1-4 of U.S. Patent No. 6,173,316, 18 pages.
220 Appendix A-28 re above #192: Claim Chart: U.S. Patent No. 6,285,364 invalidates claims 1-4 of U.S. Patent No. 6,173,316, 8 pages.
Appendix A-29 re above #192: Claim Chart: U.S. Patent 6,625,447 invalidates claims 1-4 of U.S. Patent No. 6,173,316, 47 pages.
Appendix A-30 re above #192: Claim Chart: U.S. Patent No. 6,952,799 invalidates claims 1, 2, and 4 of U.S. Patent No. 6,173,316, 9 pages.
Appendix A-31 re above #192: Claim Chart: Nokia 9000 Owner's manual invalidates claims 1-4 of U.S. Patent No. 6,173,316, 15 pages.
Appendix B-1 re above #192: Claim Chart: U.S. Patent No. 6,516,202 and U.S. Patent No. 7,603,139 Invalidate Asserted Claim 1 of U.S. Patent No. 6,976,217, 17 pages.

Appendix B-2 re above #192: Claim Chart: U.S. Patent No. 5,537,608 and US Patent No. 7,603,139 Invalidate Asserted Claims 1, 6, 7 and 8 of U.S. Patent No. 6,976,217, 24 pages.

Appendix B-3 re above #192: Claim Chart: U.S. Patent No. 5,606,594 and U.S. Patent No. 7,603,139 Invalidate Asserted Claim 1 of U.S. Patent No. 6,976,217, 28 pages.

Appendix B-4 re above #192: Claim Chart: U.S. Patent No. 6,608,637 and U.S. Patent No. 7,603,139 Invalidate Asserted Claim 1 of U.S. Patent No. 6,976,217, 15 pages.

Appendix B-5 re above #192: Claim Chart: U.S. Patent No. 6,781,575 and U.S. Patent No. 7,603,139 Invalidate Asserted Claim 1 of U.S. Patent No. 6,976,217, 8 pages.

Appendix B-6 re above #192: Claim Chart: Supplemental References That Invalidates U.S. Patent No. 6,466,236, 14 pages.

Appendix B-7 re above #192: Claim Chart: Supplemental References That Invalidate U.S. Patent No. 6,466,236, 16 pages.

Appendix B-8 re above #192: Claim Chart: Supplemental References That Invalidate U.S. Patent No. 6,466,236, 11 pages.

Appendix B-9 re above #192: Claim Chart: Supplemental References That Invalidate U.S. Patent No. 6,466,236, 8 pages.

Appendix B-10 re above #192: Claim Chart: Supplemental References That Invalidate U.S. Patent No. 6,466,236, 12 pages.

Appendix B-11 re above #192: Claim Chart: Supplemental References That Invalidate U.S. Patent No. 6,466,236, 11 pages.

Appendix B-12 re above #192: Claim Chart: U.S. Patent No. 4,860,005, U.S. Patent No. 6,453,182 and U.S. Patent No. 6,690,940 Invalidate Asserted Claims 9, 14 and 20 of U.S. Patent No. 6,928,300, 8 pages.

Appendix B-13 re above #192: Claim Chart: U.S. Patent No. 5,337,346, U.S. Patent No. 6,453,182 and U.S. Patent No. 6,690,940 Invalidate Asserted Claims 9 and 20 of U.S. Patent No. 6,928,300, 7 pages.

Appendix B-14 re above #192: Claim Chart: U.S. Patent No. 6,459,360, U.S. Patent No. 4,860,005, U.S. Patent No. 6,453,182 and U.S. Patent No. 6,690,940 Invalidate Asserted Claims 9, 14 and 20 of U.S. Patent No. 6,928,300, 7 pages.

Appendix B-15 re above #192: Claim Chart: The Nokia 9000i Communicator, U.S. Patent No. 4,860,005 and U.S. Patent No. 6,690,940 Invalidate Asserted Claims 14 and 20 of U.S. Patent No. 6,928,300, 7 pages.

Appendix B-16 re above #192: Claim Chart: The Nokia 9110 Communicator, U.S. Patent No. 4,860,005 and U.S. Patent No. 6,690,940 Invalidate Asserted Claims 14 and 20 of U.S. Patent No. 6,928,300, 6 pages.

Appendix B-17 re above #192: Claim Chart: Supplemental References That invalidate U.S. Patent No. 6,956,562, 13 pages.

Appendix B-18 re above #192: Claim Chart: Supplemental References That Invalidate U.S. Patent No. 6,956,562, 12 pages.

Appendix B-19 re above #192: Claim Chart: Supplemental References That Invalidate U.S. Patent No. 6,956,562, 18 pages.

Appendix B-20 re above #192: Claim Chart: Supplemental References That Invalidate U.S. Patent No. 6,956,562, 18 pages.

Appendix B-21 re above #192: Claim Chart: U.S. Patent No. 6,339,780 and U.S. Patent No. 6,285,364 invalidate claims 1-4 of U.S. Patent No. 6,173,316, 11 pages.

Appendix B-22 re above #192: Claim Chart: U.S. Patent No. 6,952,799 and U.S. Patent No. 6,285,364 invalidate claim 3 of U.S. Patent No. 6,173,316, 7 pages.

Appendix B-23 re above #192: Claim Chart: Browser-style interfaces to a home automation network, Peter M. Corcoran and Joe Desbonnet, Jun. 1997 and U.S. Patent No. 6,285,364 invalidate claims 14 of U.S. Patent No. 6,173,316, 11 pages.

Appendix B-24 re above #192: Claim Chart: Compact HTML in view of various patents invalidates claims 1-4 of U.S. Patent No. 6,173,316, 19 pages.

"Huawei Devices USA Inc.'s and FutureWei Technologies, Inc.'s Invalidity Contentions and Production of Documents Pursuant to P.R. 3-3 and 3-4," In the United States District Court for the Eastern District of Texas, Tyler Division, SmartPhone Technologies, LLC v. Huawei Devices USA Inc., and FutureWei Technologies, Inc., Civil Action No. 6:12-cv-245-LED, filed Nov. 9, 2012, 40 pages.

Appendix A re above #248: Claim Chart: Apple iBook Computer with AirPort Card Invalidates Asserted Claims 18, 19, 20, and 26 of U.S. Patent No. 6,950,645 (A-1), 1266 pages.

Appendix B re above #248: Claim Chart: Supplemental References Invalidate Asserted Claims 18, 19, 20, and 26 of U.S. Patent No. 6,950,645 (B-1), 399 pages.

* cited by examiner

445

| CHAR | PRES. RANGE | STROKE DATA |
|---|---|---|
| a | P1 |  |
| b | P1 |  |
| c | P1 |  |
| d | P1 |  |
| e | P1 |  |
| f | P1 |  |
| g | P1 |  |
| h | P1 |  |
| i | P1 |  |
| j | P1 |  |
| k | P1 |  |
| l | P1 |  |
| m | P1 |  |

| CHAR | PRES. RANGE | STROKE DATA |
|---|---|---|
| n | P1 |  |
| o | P1 |  |
| p | P1 |  |
| q | P1 |  |
| r | P1 |  |
| s | P1 |  |
| t | P1 |  |
| u | P1 |  |
| v | P1 |  |
| w | P1 |  |
| x | P1 |  |
| y | P1 |  |
| z | P1 |  |

450  460  470

472

| CHAR | PRES. RANGE | STROKE DATA |
|---|---|---|
| A | P2 | |
| B | P2 | |
| C | P2 | |
| D | P2 | |
| E | P2 | |
| F | P2 | |
| G | P2 | |
| H | P2 | |
| I | P2 | |
| J | P2 | |
| K | P2 | |
| L | P2 | |
| M | P2 | |

| CHAR | PRES. RANGE | STROKE DATA |
|---|---|---|
| M | P2 | |
| O | P2 | |
| P | P2 | |
| Q | P2 | |
| R | P2 | |
| S | P2 | |
| T | P2 | |
| U | P2 | |
| V | P2 | |
| W | P2 | |
| X | P2 | |
| Y | P2 | |
| Z | P2 | |

| CHAR | PRES. RANGE | STROKE DATA |
|---|---|---|
| 0 | P1 & P2 | OO |
| 1 | P1 & P2 | ⎸ |
| 2 | P1 & P2 | 2 |
| 3 | P1 & P2 | 3 |
| 4 | P1 & P2 | L L |

| CHAR | PRES. RANGE | STROKE DATA |
|---|---|---|
| 5 | P1 & P2 | 5 5 5 |
| 6 | P1 & P2 | 6 |
| 7 | P1 & P2 | 7 |
| 8 | P1 & P2 | 8 8 |
| 9 | P1 & P2 | 9 |

METHOD AND APPARATUS FOR USING PRESSURE INFORMATION FOR IMPROVED COMPUTER CONTROLLED HANDWRITING RECOGNITION DATA ENTRY AND USER AUTHENTICATION

CROSS REFERENCE TO RELATED APPLICATIONS

This application is a divisional application of application Ser. No. 10/672,382, entitled "Method and Apparatus for Using Pressure Information for Improved Computer Controlled Handwriting Recognition Data Entry and User Authentication," filed Sep. 25, 2003, now allowed, which is a continuation application of application Ser. No. 09/516,656, entitled "Method and Apparatus for Using Pressure Information for Improved Computer Controlled Handwriting Recognition Data Entry and User Authentication," filed Mar. 1, 2000, now U.S. Pat. No. 6,707,942, and assigned to the assignee of the present application. The subject matter in the above-identified and commonly owned application(s) are incorporated herein by reference.

BACKGROUND OF THE INVENTION

1. Field of the Invention

The present invention relates to the field of data entry methods and mechanisms for computer systems. The present invention is directed to the field of palmtop computers and handwriting recognition systems and handwriting-based data entry and user authentication. Specifically, the present invention discloses an efficient mechanism for automatic character recognition and display attribute recognition.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer and electronic notepads, to name a few. Palmtop computers with PIM software have been know as Personal Digital Assistants (PDAs).

Data entry on a palmtop computer has been a challenge. Since palmtop computer systems are very small, full-sized keyboards are generally not efficient input devices. Palmtop computers using keyboards have keyboard devices that are so small that a user cannot touch-type. Furthermore, to use a keyboard device, a user must either place the palmtop computer system down onto a flat surface, so the user can type with both hands, or the user holds the palmtop computer system with two hands and types with thumbs only.

Instead of a mechanical keyboard device, some palmtop computers utilize a touch screen and display an image of a small keyboard thereon. When a particular button is pressed or tapped, a small keyboard image is displayed on the display screen. The user then interacts with the on-screen small keyboard image to enter characters, usually one character at a time. To interact with the displayed keyboard image (e.g., "virtual keyboard"), the user taps the screen location of a character with a pen or stylus. That corresponding character is then recognized and added to a data entry field, also displayed on the screen. However, for experienced users, the virtual keyboard input system can be a tedious input process.

Instead of using a mechanical keyboard device or a displayed keyboard, many palmtop computers employ a pen and a digitizer pad as an input system. The pen and digitizer pad combination works well for palmtop computers because the arrangement allows a user to hold the palmtop computer system in one hand while writing with the pen onto the digitizer pad with the other hand.

A number of palmtop computer systems that rely on the pen and digitizer pad combination as the primary means of input have been introduced to the market. Most of these pen-based palmtop computer systems provide some type of handwriting recognition system whereby the user can write words and letters on the digitizer pad with a stylus. The palmtop computer system then converts the user's handwriting into a machine readable format such as ASCII code characters. Examples of pen-based palmtop computer systems that provide handwriting recognition include the Apple Newton (trademark) device and the Tandy Zoomer (trademark) device.

Consumer acceptance of many pen based palmtop computer systems has been limited due to the performance of handwriting recognition systems. When a human reads a handwritten message, the human uses various clues to decipher the handwriting such as the known spelling of words, the known subject of the message, the writer's character writing style, and knowledge of English grammar. Since it is very difficult to teach a computer system all these subtle handwriting recognition heuristics, most handwriting recognition systems only rely on the writer's input strokes and a dictionary of common words. Using such limited information, such handwriting recognition systems often yield inaccurate results.

Some handwriting recognition techniques divide the recognition task into steps for identifying individual characters. Another handwriting recognition system is described in U.S. Pat. No. 5,889,888, issued on Mar. 30, 1999 entitled, "Method and Apparatus for Immediate Response Handwriting Recognition System that Handles Multiple Character Sets." This character recognition system recognizes a large number of different characters with less effort on the user's part (e.g., fewer "mode change" strokes). This U.S. Pat. No. 5,889,888 is incorporated herein by reference.

However, one of the great difficulties in machine-based handwriting recognition is selecting between different, yet similarly shaped (or drawn) characters. For example, when using the handwriting recognition processes of the U.S. Pat. No. 5,889,888 it is difficult to enter the letter "V." The character based handwriting recognition typically mistakenly determines the input character to be the letter "U" for "V" strokes. In other instances, it is difficult to differentiate between a lower case character and an upper case character in cases when the upper case and the lower case characters are similar in shape, e.g., in the case of "o" versus "O" and "t" versus "T" and "F" versus "f," etc. What is done instead is to require a special "prestroke" to indicate the case of the character. However, sometimes the prestroke is drawn incorrectly and it improperly becomes recognized as a character itself, thereby causing confusion and difficulty for the user. It would be advantageous to be able to eliminate this prestroke requirement to offer a more natural writing style for selecting between character sets. It would be advantageous, then, to provide a more effective handwriting recognition mechanism for a computer system.

Also, in many graphics applications and word processors, a user wants to select between different character sets, e.g., to select fonts, character sizes, line widths, colors, etc. Normally, small buttons or icons are placed on the screen by the application allowing a user to select these features. However, in the case of palmtop computers, the screen is very small and these buttons and icons become very small indeed and therefore hard to see and select. It would be advantageous to provide a mechanism for selecting character sets without requiring an on-screen button or icon to be selected first.

Authentication is also an important issue with respect to palmtop computers because they can so readily be stolen, concealed and then used by an unauthorized person. Heretofore, a character based password has been used for locking down the computer system until the password is correctly entered. It would be advantageous to provide a more secure authentication system that was not character based.

SUMMARY OF THE INVENTION

Accordingly, what is needed is an effective and natural mechanism and method for discriminating between the case of characters within a handwriting recognition system. What is also needed is a mechanism for allowing a user to select different character sets or display attributes within an application program without requiring that a small icon or window be first selected. What is needed is a palm sized computer system that offers an improved authentication mechanism that is not entirely character-based. The present invention provides these advantages and others not specifically mentioned above but described in the sections to follow.

A method and system are described utilizing both (x, y) coordinate ("spatial") stroke data and associated pressure information for improved handwriting recognition and other uses. The method and system can also be applied to all types of handwriting-based data entry applications and also to user authentication. The digitizer pad used in the palmtop computer system gives both spatial information and associated pressure data when a stroke is being drawn thereon, e.g., by a stylus. Pressure information can be used to differentiate between different character sets, e.g., upper case and lower case characters for certain alphabetic characters. The spatial stroke data then identifies the particular character within the selected character set.

The pressure information can also be used to adjust any display attribute, such as character font size, font selection, color, italic, bold, underline, shadow, language, etc. Again, the spatial stroke data then identifies the particular character within the selected character set. The associated pressure information can also be used for recognizing a signature. In this case, a user is allowed to sign a name on the digitizer pad. This provides non-character based user authentication that relies not only on the spatial stroke data but also on the pressure applied at different points in the signed name or image. Pressure information can also be used to provide improved handwriting-based data entry. For instance, in a drafting program, the pressure of a drawn line can be used to determine its width. Generally, pressure data can also be used to improve handwriting recognition tasks and heuristics.

More specifically, an embodiment of the present invention includes a method and system of recognizing data representing a user-drawn character, the method comprising the steps of: a) accessing spatial stroke data and pressure data captured by a digitizer and representing the user-drawn character wherein respective pressure data is associated with respective spatial stroke data; b) storing the spatial stroke data and pressure data into a computer memory wherein pressure data of a first range represents a first character set and pressure data of a second range represents a second character set; c) performing character recognition on the spatial stroke data and the pressure data, the step c) comprising the steps of: c1) using the pressure data to identify a character set; and c2) using the spatial stroke data to identify a particular character within the identified character set; and d) displaying the particular character on a display screen of a computer system. Embodiments include the above and wherein the first character set comprises upper case alphabetic characters and wherein the second character set comprises lower case alphabetic characters.

Embodiments also include a method and system for using pressure data and spatial stroke data for drawing a graphics element, e.g., a line and differentiating between a thick element and a thin element for use within a graphics application. Embodiments also include method and system for using pressure data and spatial stroke data for performing user authentication. Embodiments also include method and system for using pressure data and spatial stroke data for improved handwriting recognition.

BRIEF DESCRIPTION OF THE DRAWINGS

FIG. 11 is a table illustrating spatial stroke data and pressure ranges for recognizing upper case alphabetic characters in accordance with an embodiment of the present invention.

FIG. 12 is a table illustrating spatial stroke data and pressure ranges for recognizing case-less numeric characters in accordance with an embodiment of the present invention.

DETAILED DESCRIPTION OF THE INVENTION

In the following detailed description of the present invention, a method and system for using (x, y) stroke data with associated pressure data for performing improved handwriting recognition, user authentication and also handwriting-based data entry in a computer system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.
Notation and Nomenclature Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figure 1:
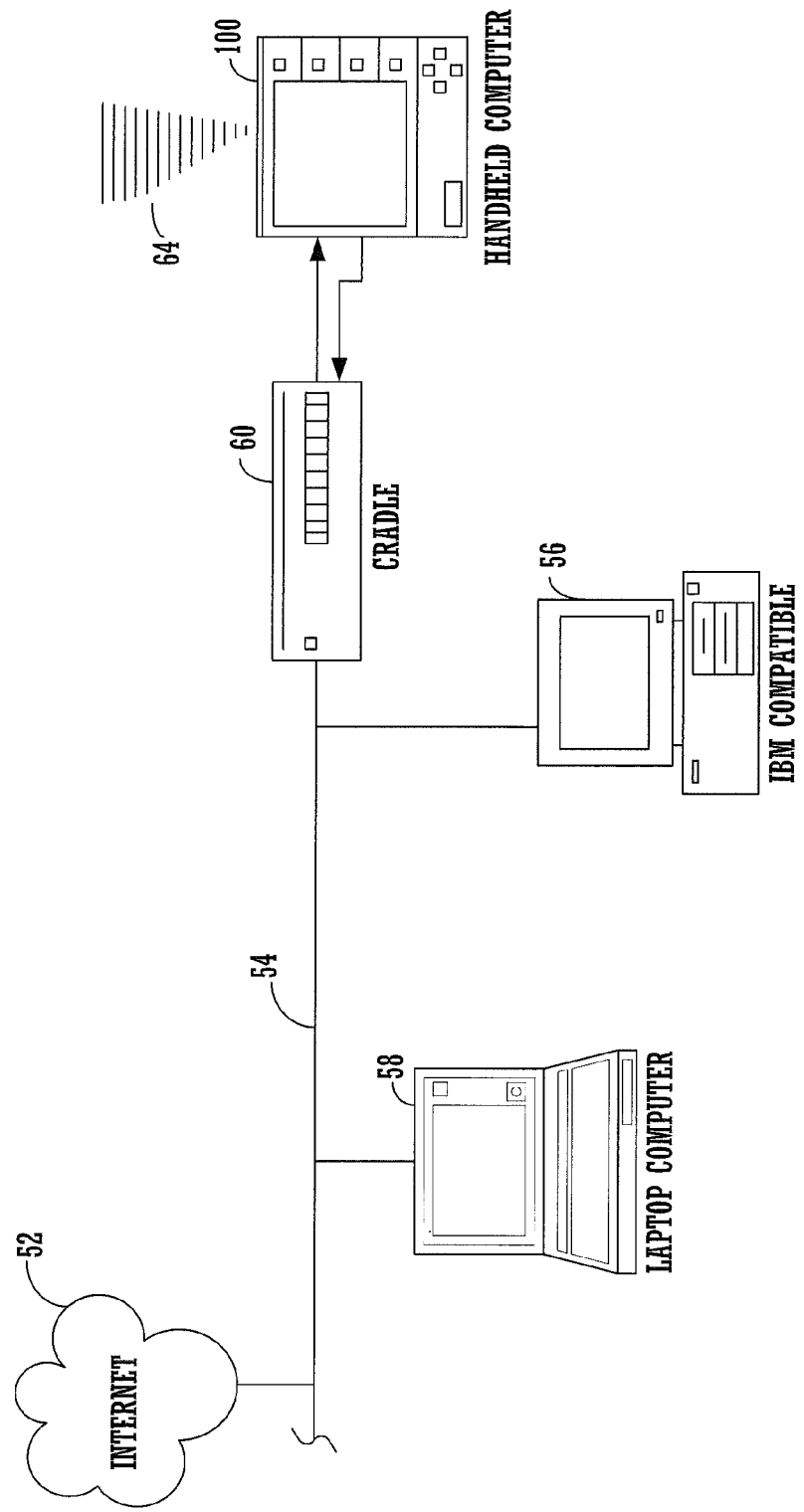
FIG. 1 is system illustration of a palmtop or "palm sized" computer system connected to other computer systems and the Internet via a cradle device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.
Exemplary Palmtop Computer System Platform FIG. 1 illustrates a system 50 that can be used in conjunction with the recognition systems of the present invention that are based on using spatial coordinate stroke data with associated pressure data. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
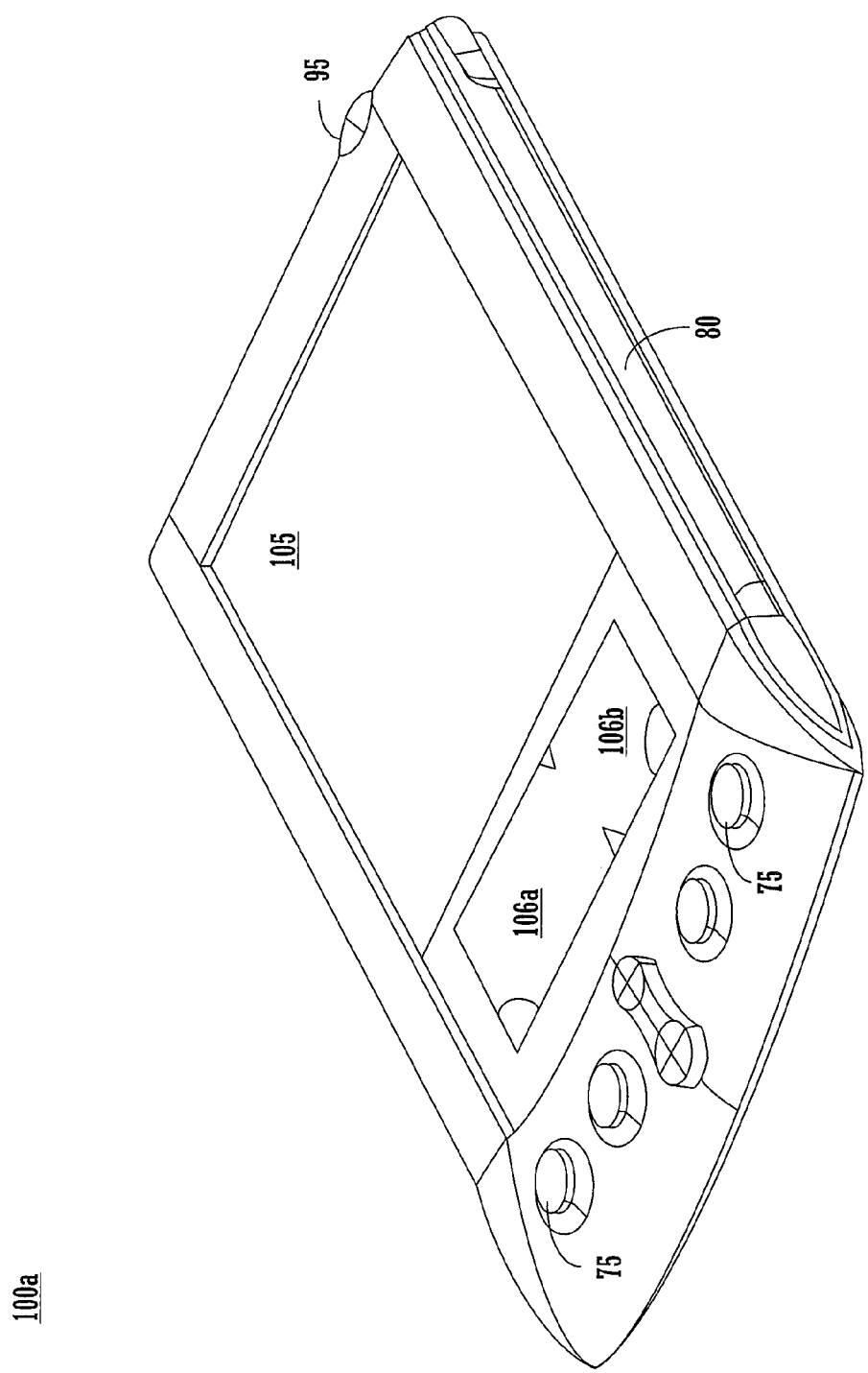
FIG. 2A is a top side perspective view of a palmtop computer system that can be used as a platform for the data entry and authentication embodiments of the present invention.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

Importantly, FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
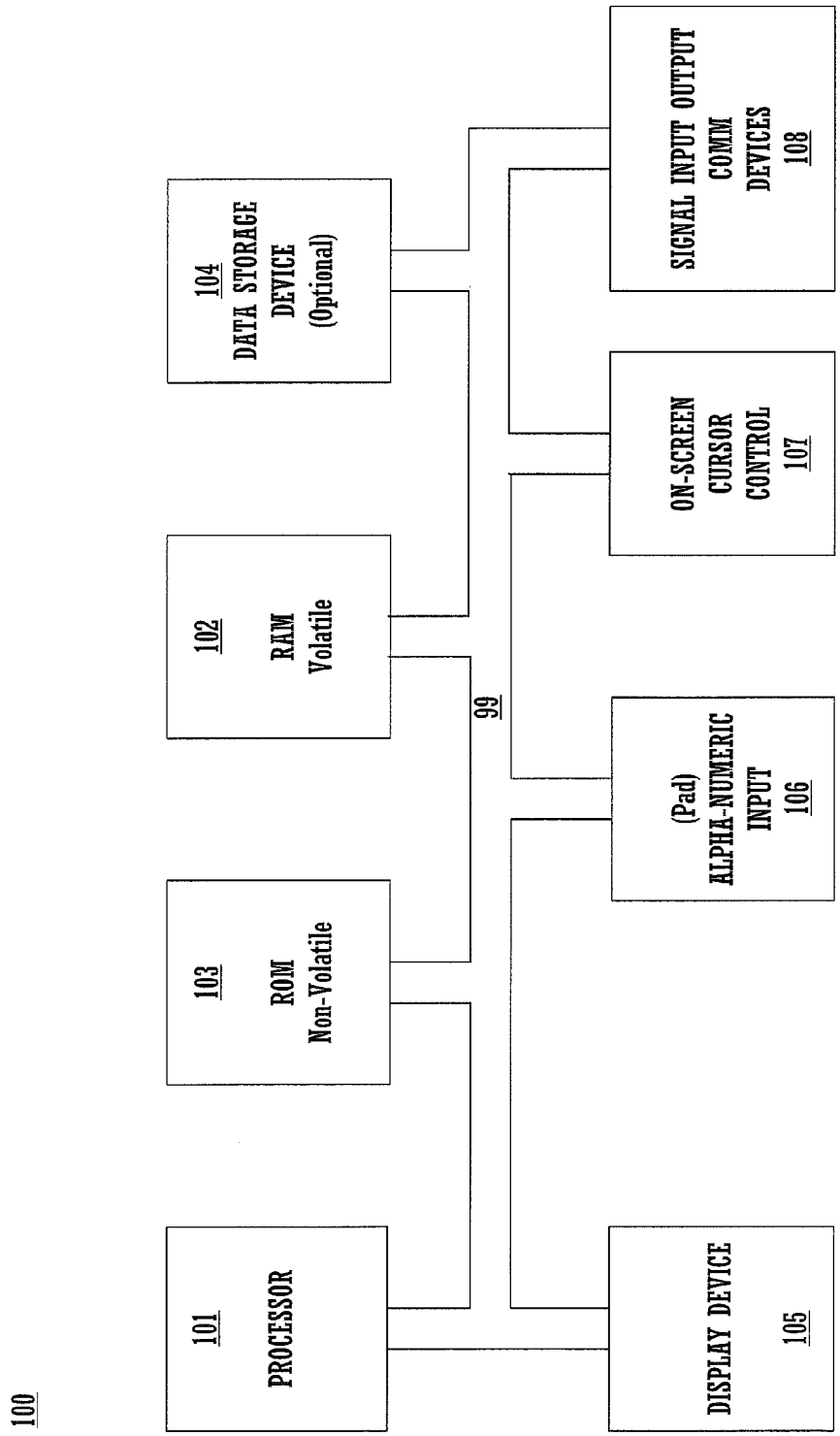
FIG. 5 is a logical block diagram of the palmtop computer system in accordance with an embodiment of the present invention.

The digitizer 106 (106a and 106b) records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. In an alternate embodiment, the channels could be sampled simultaneously, converted and then read back separately in either a parallel or serial manner. The sampled data is then stored in a memory by the processor 101 (FIG. 5) for later analysis.

Figure 2B:
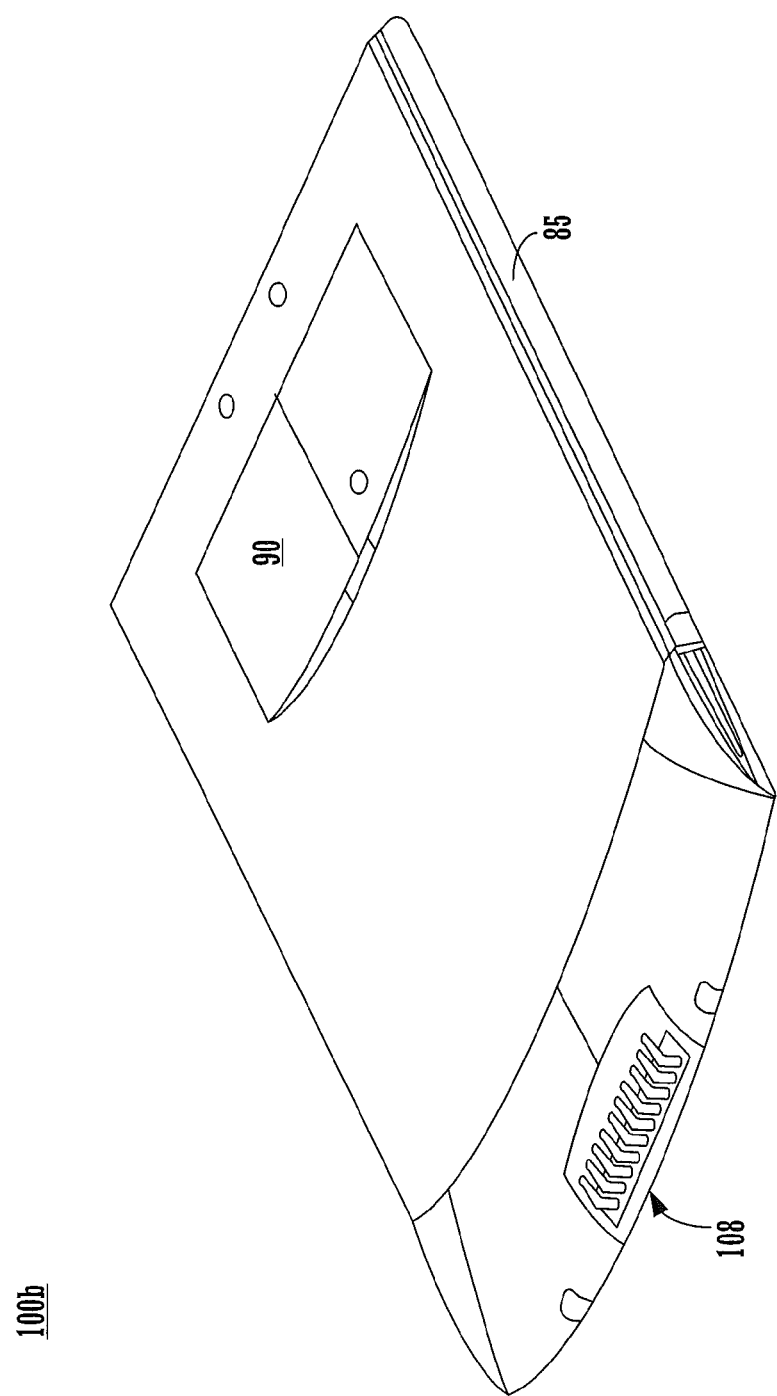
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 3:
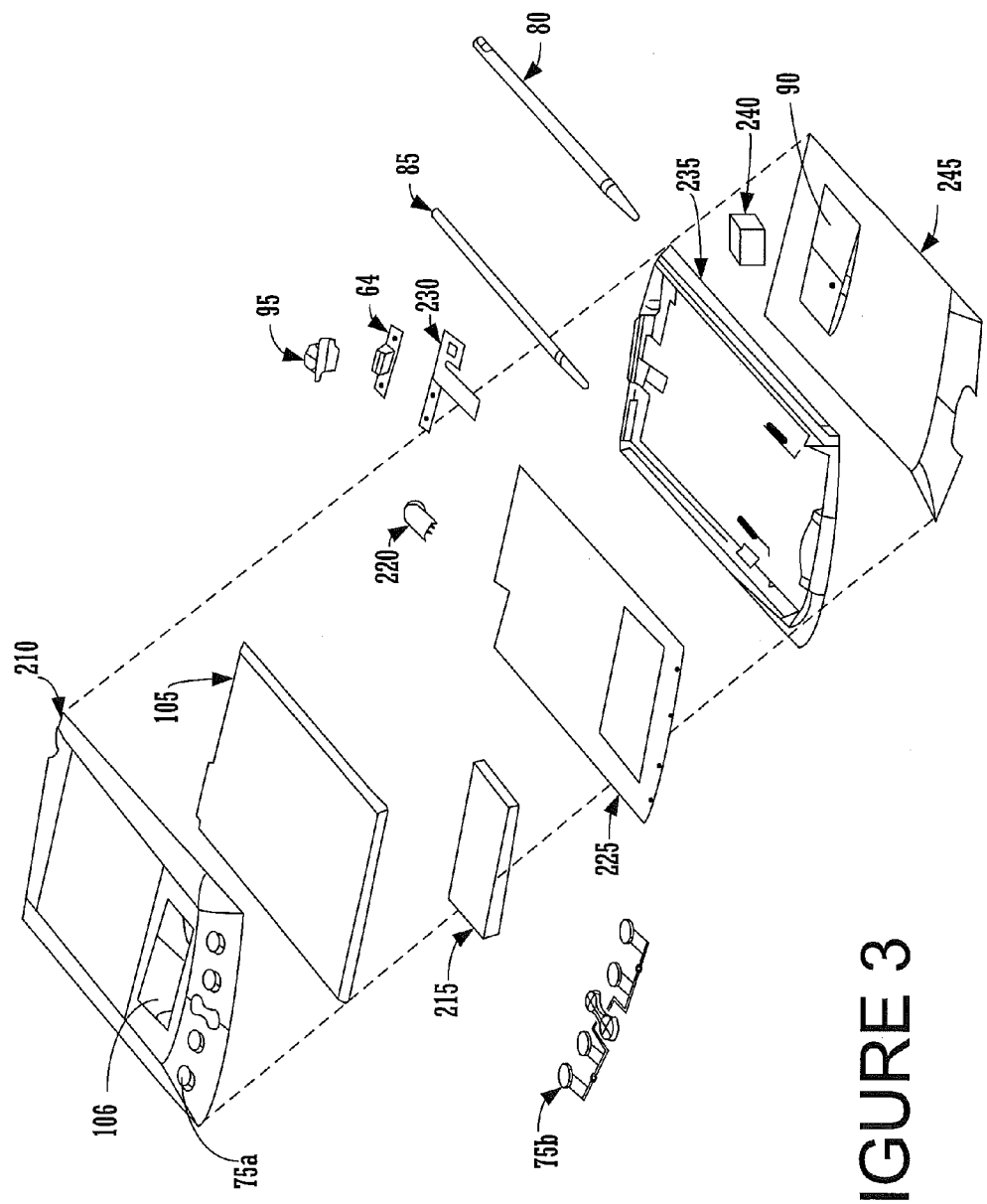
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75*a* for receiving buttons 75*b*. A flat panel display 105 (both liquid crystal display and touch screen) fits into front cover 210. Any of a number of display technologies can be used, e.g., LCD, FED, plasma, etc., for the flat panel display 105. The touch screen can be a digitizer. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad can be part of the display assembly or it can also be included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
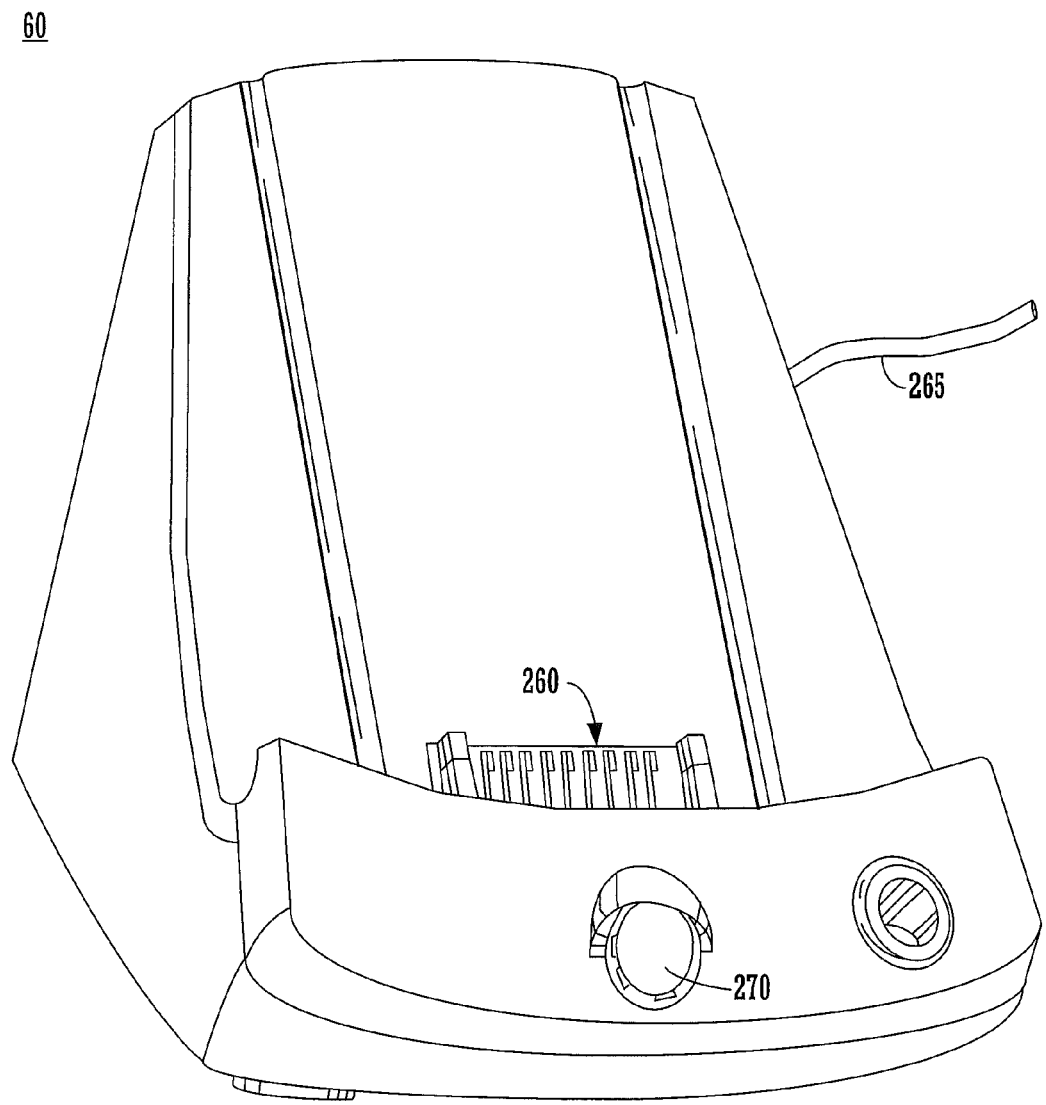
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between system 100 and other computer systems coupled to electrical interface cable 265.

FIG. 5 illustrates circuitry of computer system 100, some of which can be implemented on PC board 225. The computer system 100 can be used to perform character recognition processes and authentication of the present invention, e.g., processes 600 and 640 (FIG. 13A and FIG. 13B) and process 650 (FIG. 14). Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 100 of FIG. 5 is an alphanumeric input device 106 which in one implementation is a handwriting recognition pad ("digitizer") having regions 106*a* and 106*b* (FIG. 2A), for instance. Device 106 can communicate information (spatial data and pressure data) and command selections to the central processor 101. System 100 also includes an optional cursor control or directing device 107 coupled to the bus for communicating user input information and command selections to the central processor 101.

In one implementation, device 107 is a touch screen device incorporated with screen 105. Device 107 is capable of registering a position on the screen 105 where the stylus makes contact and the pressure of the contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Figure 6:
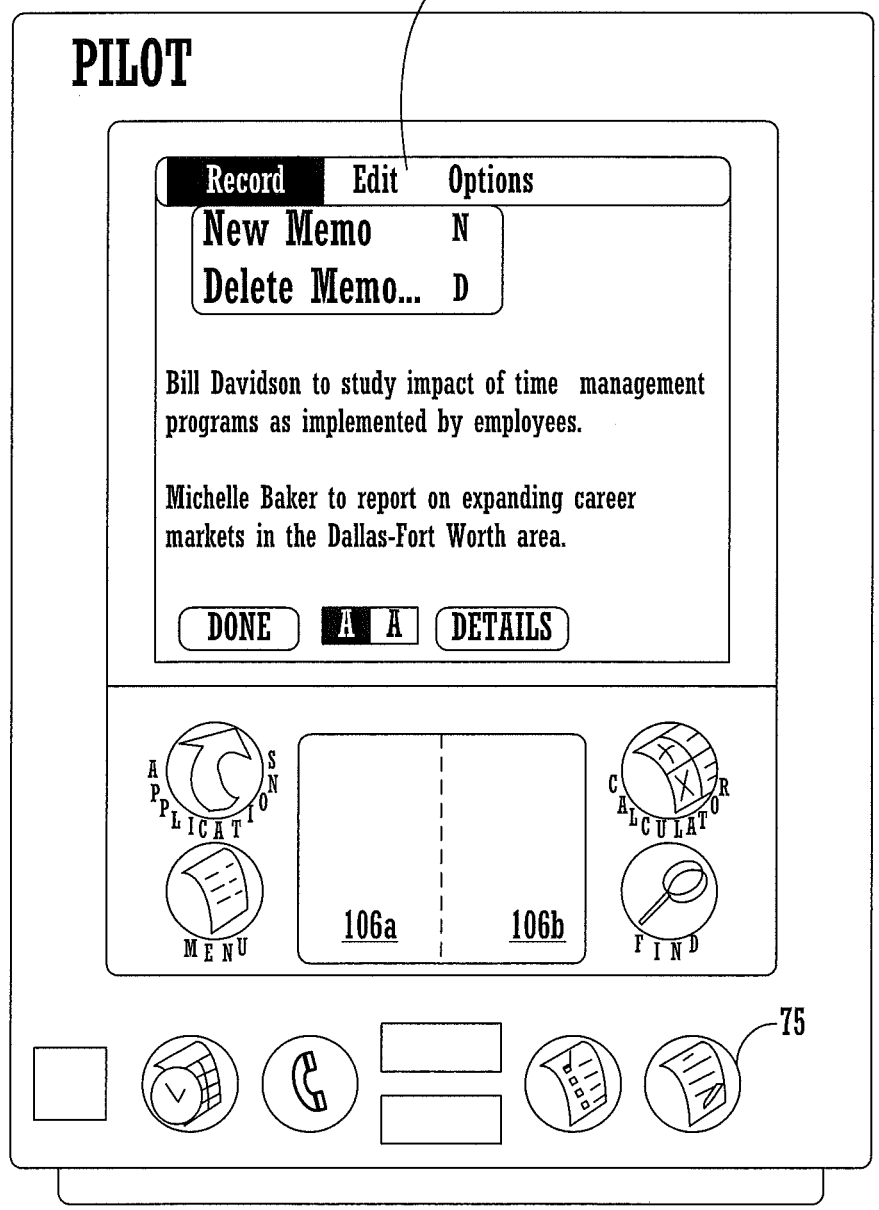
FIG. 6 is a front view of a palm top computer system illustrating the display screen, digitizer regions and an exemplary menu in accordance with the present invention.

FIG. 6 is a front view of the palmtop computer system 100 with a menu bar 305 open displaying a pull down window. Also shown are two regions of digitizer 106*a* and 106*b*. Region 106*a* is for receiving user stroke data (and pressure data) for alphabetic characters, and typically not numeric characters, and region 106*b* is for receiving user stroke data (and pressure data) for numeric data, and typically not for alphabetic characters. Physical buttons 75 are also shown. Although different regions are shown for alphabetic and numeric characters, the present invention is also operable within a single region that recognizes both alphabetic and numeric characters.

Figure 7:
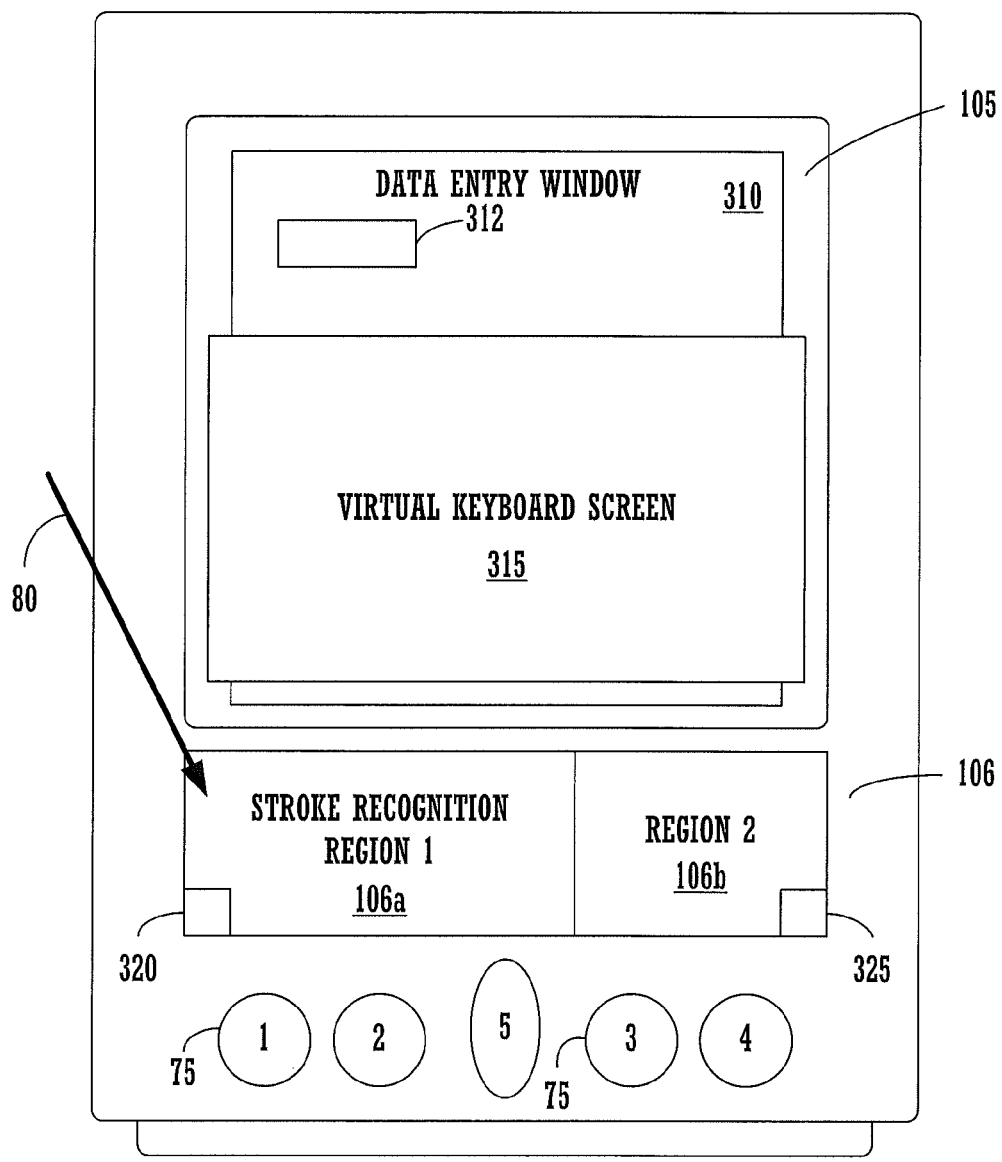
FIG. 7 illustrates a display screen showing a data entry window and a virtual keyboard window and also illustrates a handwriting recognition digitizer on the palmtop computer system in accordance with embodiments of the present invention.

FIG. 7 is a front view of the palmtop computer system 100 with several display windows open on screen 105 including a virtual keyboard window 315. The user has the choice of displaying a virtual keyboard image on display 105 and entering characters by selecting one of the displayed characters of the virtual keyboard image. Window 310 is part of a generic application program executing on system 100. Window 310 is a data entry window within which the generic application program is requesting information to be entered by a user. The information requested and the application program could be any information and any program. Typically, data entry window 310 has at least one data entry field 312 for accepting character data therein. When not entering data using the virtual keyboard 315, the user can stroke a character within pad 106 (either region 106*a* or 106*b*) or on screen 105. The recognized character is then also placed into the displayed data entry field for user verification and use. This process can be repeated.

It is appreciated that, in one embodiment, the digitizer region 106*a* and 106*b* is separate from the display screen 105 and therefore does not consume any display area.

Using (x, y) Spatial Stroke Data and Associated Pressure Information for Improved Handwriting Recognition Data Entry and User Authentication As described above, the digitizer 106 of computer system 100 provides both pressure data and also (x, y) spatial stroke data when stylus 80 makes contact with the digitizer pad 106. It is also appreciated that screen 105 also contains a digitizer associated with it and capability of providing the same type of information as provided by digitizer 106. Therefore, the screen 105 also provides both pressure data and also (x, y) spatial stroke data when stylus 80 makes contact with the screen 105. Either digitizer can be implemented using well known devices, for instance, using the ADS-7846 device by Burr-Brown that provides separate channels for spatial stroke information and pressure information. The embodiments of the present invention described below, make use of both pressure data and (x, y) spatial stroke data (from either digitizer) in performing various functions, e.g., character recognition, character set differentiation, character size differentiation, graphic element size differentiation and user authentication.

Figure 8:
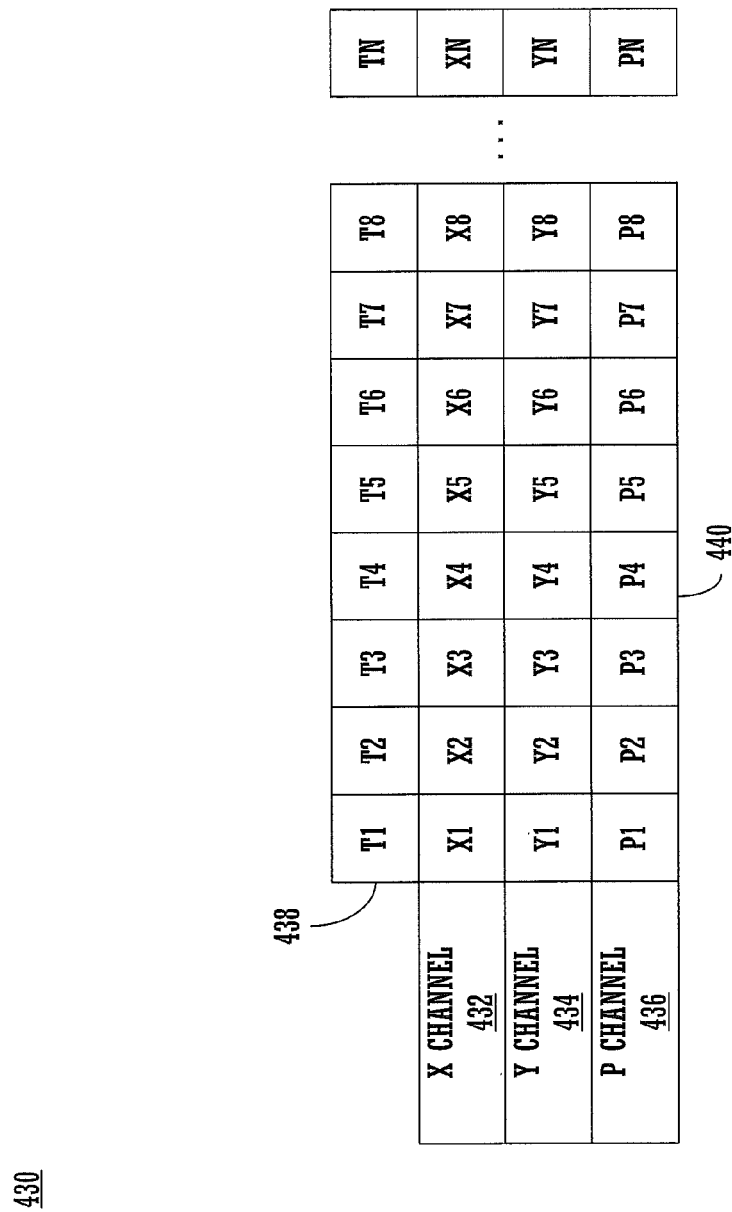
FIG. 8 illustrates a three dimensional logical diagram of a volume used for performing stroke recognition with associated pressure data in accordance with an embodiment of the present invention.

FIG. 8 illustrates an exemplary format 430 in which digitizers of the present invention provide both pressure data and also (x, y) spatial stroke data. Discrete units of time, T1-TN, are shown in row 438. Associated with each discrete unit of time, is a discrete x-coordinate shown in the x-channel 432. Also associated with each discrete unit of time, is a discrete y-coordinate shown in the y-channel 434. In addition, associated with each discrete unit of time, is a discrete pressure data shown in the p-channel 436. Each of the channels can be sampled by processor 101 over bus 99 (FIG. 5). A particular sample, e.g., at time T4, represents three respective data pieces that are associated with the sample period, e.g., an x-coordinate (X4), a y-coordinate (Y4) and a pressure value (P4). The (x, y) data is "spatial" stroke data because it indicates a position on the digitizer where contact is made with the stylus 80. The pressure channel contains "pressure data." Data of a same sample period are said to be associated. In one implementation, the processor 101 samples the channels in series (not in parallel) and therefore while the respective data pieces for a given sample period are sampled at a high rate of speed, they are not sampled purely simultaneously. Rather, they are sampled "pseudo simultaneously." In one implementation, all of the spatial data and pressure data of FIG. 8 are digital values.

Figure 9:
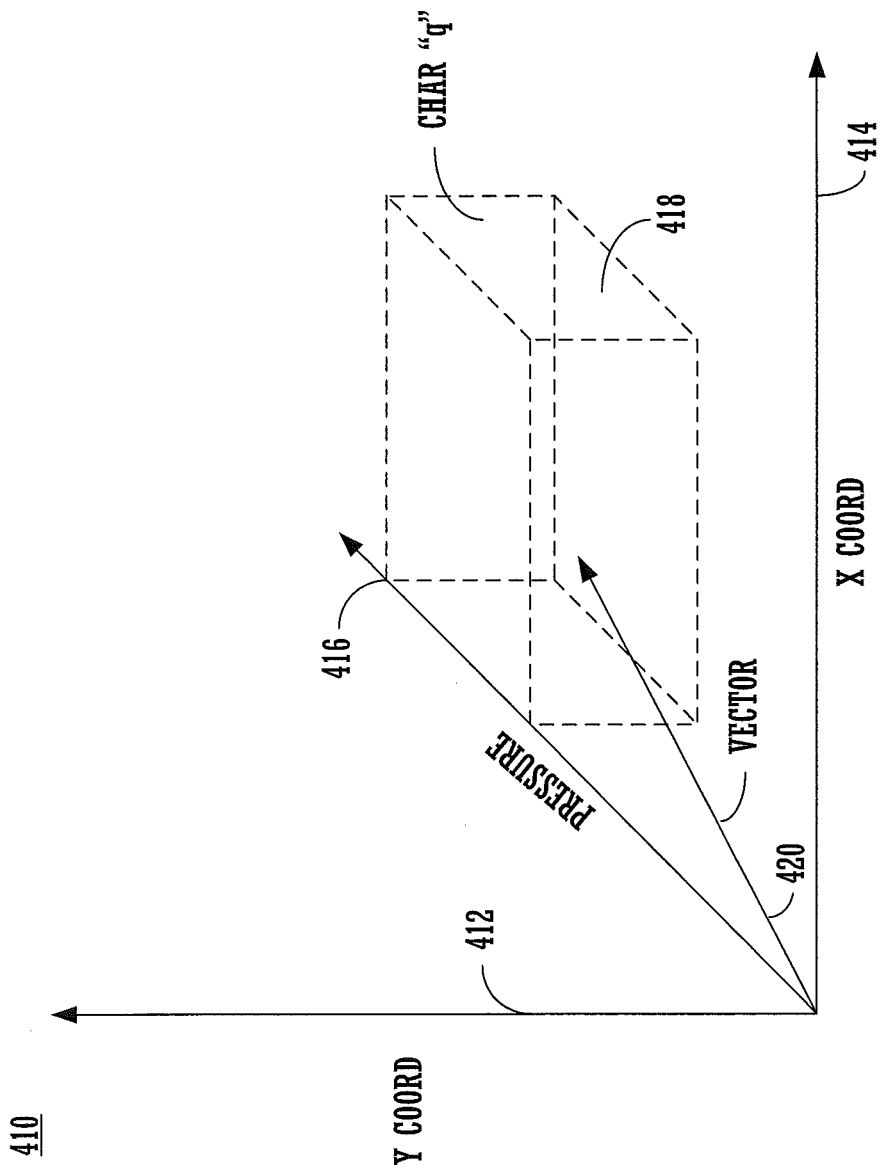
FIG. 9 illustrates an exemplary sample of (x, y) coordinate ("spatial") stroke data along with associated pressure data in accordance with an embodiment of the present invention.
Figure 13A:
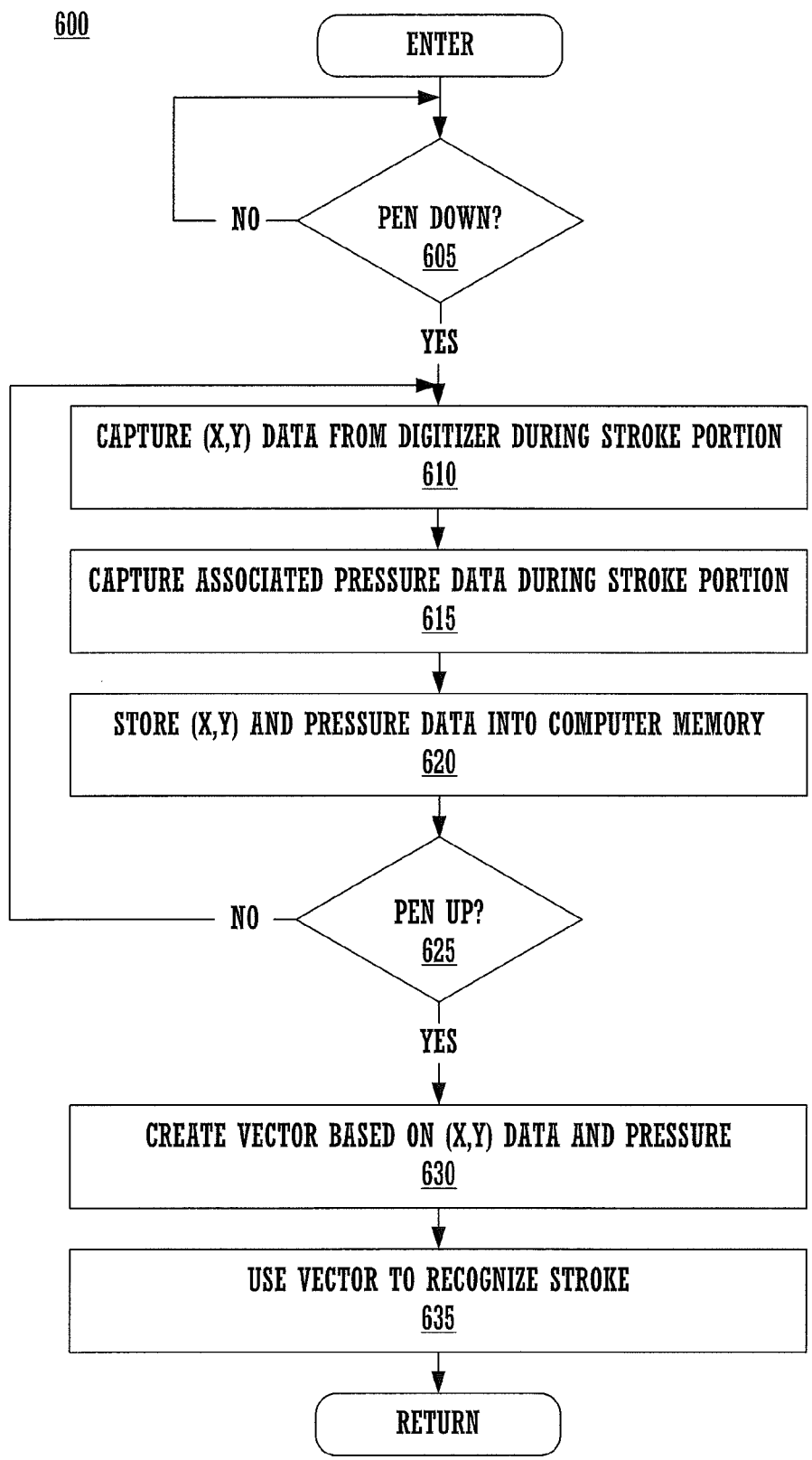
FIG. 13A is a flow diagram illustrating steps in a computer implemented method for using (x, y) coordinate stroke data along with associated pressure data for performing character recognition in accordance with one embodiment of the present invention.
Figure 14:
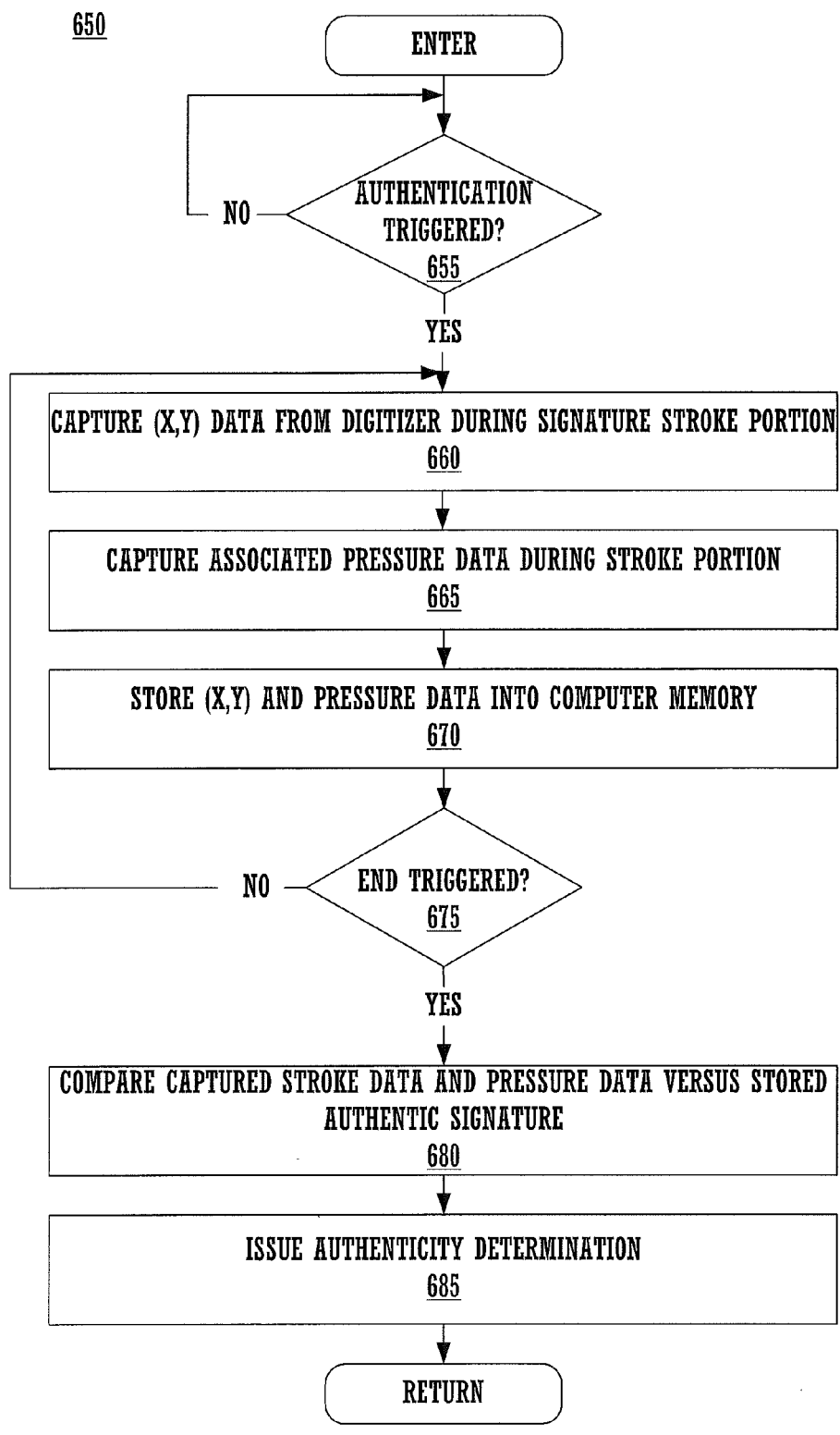
FIG. 14 is a flow diagram illustrating steps in a computer implemented method for using (x, y) coordinate stroke data along with associated pressure data for performing user, e.g., signature, authentication in accordance with one embodiment of the present invention.

FIG. 9 and FIG. 13A illustrate a diagram and flowchart of one manner in which pressure data can be used along with spatial stroke data in performing handwriting recognition. Volume 410 of FIG. 9 represents a three dimensional map. Volume 410 is referenced by three dimensions which can be associated with the y-coordinate 412, the x-coordinate 414 and the pressure data 416. Volume 410 can contain a plurality of sub-volumes, each representing a different character. One exemplary sub-volume 418 is shown. Sub-volume 418 represents the volume defined for an exemplary character, "q." A vector 420 or radial projection (obtained from spatial stroke and pressure data) can be placed into the volume 410. Character recognition is then performed by identifying the sub-volume to which the radial projection points. Handwriting recognition using a vector and volume is described in a work entitled, "Introduction to Radial Basis Function Networks," by Mark J. L. Orr, published by the Centre for Cognitive Science, University of Edinburgh, 2, Buccleuch Place, Edinburgh EH8 9LW, which is incorporated herein by reference as background to illustrate the state of the art.

A handwriting recognition process 600 using pressure data, spatial stroke data, a volume 410 and a radial projection is shown in FIG. 13A. The process 600 commences when the stylus 80 or pen is detected as touching the digitizer, step 605. During the user-drawn stroke, steps 610, 615 and 620 capture the spatial stroke data and associated pressure data and store this information in memory. This continues until the stylus 80 is detected as no longer making contact with the digitizer, step 625.

Once spatial stroke data and pressure data for a user-drawn character or stroke is received, it is processed by computer system 100 to produce a single vector 420 that has coordinates matching the volume 410, step 630 of FIG. 13A. The vector 420 is then mathematically placed into volume 410 to determine the sub-volume to which the vector 420 points, step 635. The spatial stroke data and pressure data (obtained by steps 610-625) is then recognized to be the character associated with the sub-volume to which the vector 420 points. In this exemplary case, the vector 420 points to the sub-volume defined for the character, "q." Therefore, the spatial stroke data and the pressure data associated with this exemplary user-drawn stroke is recognized as a "q." Once given spatial stroke data and associated pressure data, it is appreciated that a number of well known character recognition techniques can be modified to analyze this data, including the technique described in U.S. Pat. No. 5,889,888, issued on Mar. 30, 1999 to Michael Albanese and Jeff Hawkins, which is incorporated herein by reference.

It is appreciated, then, that this embodiment of the present invention utilizes pressure data of the user-drawn stroke in creating the vectors that are then used to determine or "recognize" the characters. A number of various well known handwriting recognition methods can be used in accordance with the present invention, as long as pressure data is used in the character recognition analysis.

Figure 10:
FIG. 10 is a table illustrating spatial stroke data and pressure ranges for recognizing lower case alphabetic characters in accordance with an embodiment of the present invention.
Figure 10:
Figure 10:
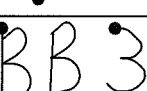
Figure 10:
Figure 10:
Figure 10:
Figure 10:
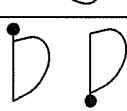
Figure 10:
Figure 10:
Figure 10:
Figure 10:
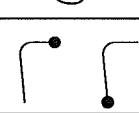
Figure 10:
Figure 10:
Figure 10:
Figure 10:
Figure 10:
Figure 10:
Figure 10:
Figure 10:
Figure 10:
Figure 10:
Figure 10:
Figure 10:
Figure 10:
Figure 10:
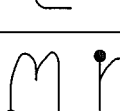
Figure 10:

FIG. 10, FIG. 11 and FIG. 12 illustrate another embodiment of the present invention that utilizes pressure data to determine which of a number of different character sets to select from when recognizing a character. After the character set is determined, then spatial stroke data is used to identify a particular character of the identified character set. The exemplary character sets of upper and lower case are shown below as an example, but any character set differentiation can be done.

FIG. 10 illustrates a character set definition 445 of lower case alphabetic characters, a-z. The characters are shown in column 450. Associated with each character is the spatial stroke data, column 470, which is used to recognize the character. Also associated with each character is a pressure range, P1, column 460, used to recognize the character set 445. In one embodiment, the pressure range, P1, is a low pressure range but could be of any pressure range.

Within this same embodiment, FIG. 11 illustrates a character set definition 472 of upper case alphabetic characters, A-Z. The characters are shown in column 475. Associated with each character is the spatial stroke data, column 485, which is used to recognize the character. In this embodiment, spatial stroke data of column 485 is the same as column 470 (FIG. 10). Also associated with each character is a pressure range, P2, column 480, used to recognize the character set 472. In one embodiment, the pressure range, P2, is a pressure range that is higher than pressure range P1. Pressure ranges P1 and P2 do not overlap.

FIG. 12 illustrates a character set 500 of the numeric characters 0-9, column 510. Both pressure ranges P1 and P2, column 515, can be used for this character set since upper/lower case differentiation is not required. Associated with each character is the spatial stroke data, column 520, which is used to recognized the character.

Figure 13B:
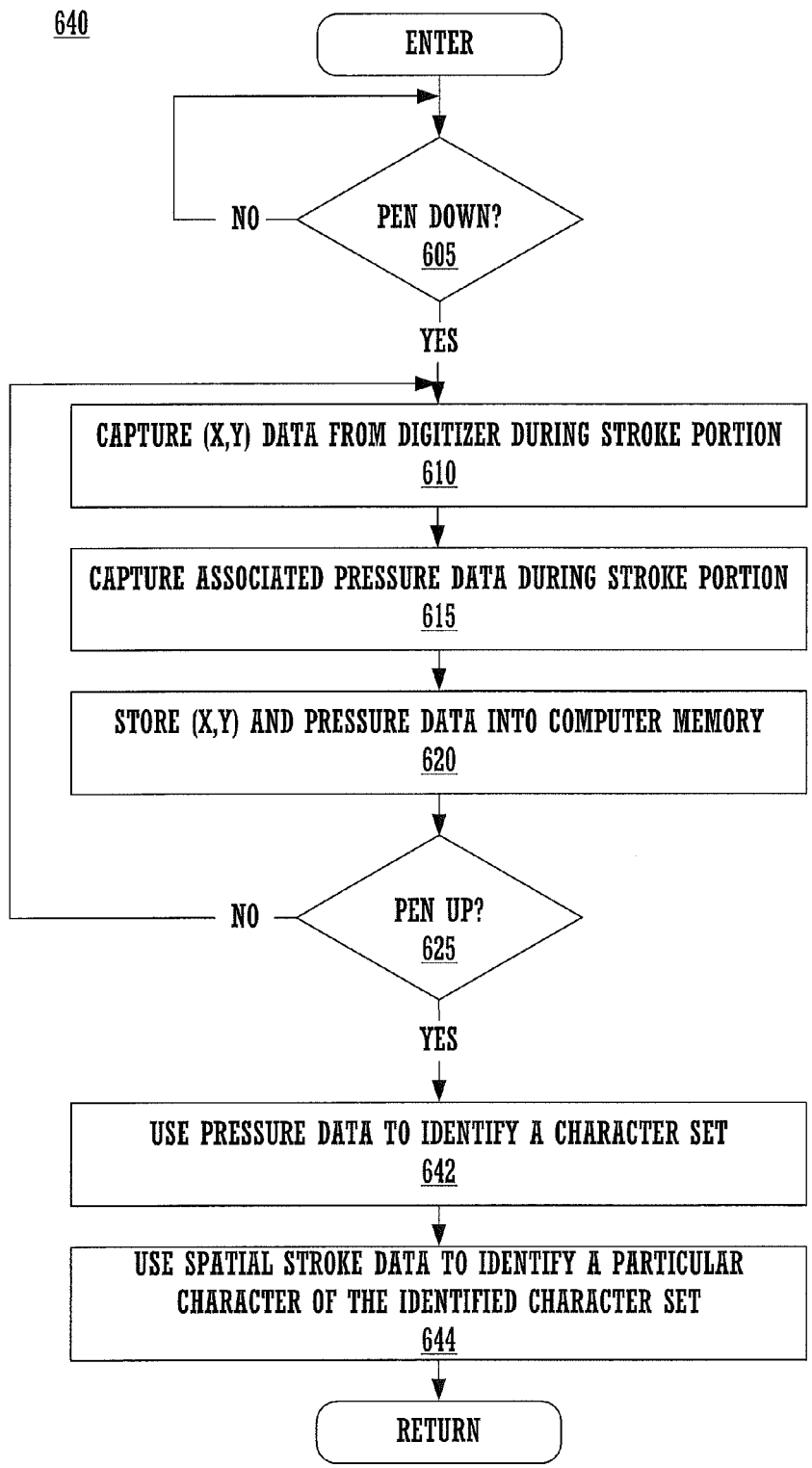
FIG. 13B is a flow diagram illustrating steps in a computer implemented method for using (x, y) coordinate stroke data along with associated pressure data for identifying a character set and a character in accordance with one embodiment of the present invention.

FIG. 13B illustrates a flowchart of steps in accordance with a handwriting recognition process 640 that uses the character set information of FIG. 10, FIG. 11 and FIG. 12. Using the process 640, a user can enter lower case characters using a low pressure stroke and can enter upper case character using a high pressure stroke. For a given character, the stroke is the same, only the pressure differentiates the character set. Alternatively, low pressure can identify upper case and high pressure can identify lower case. Steps 605-625 of FIG. 13B are the same as those described with respect to FIG. 13A. At step 642, the present invention uses the captured pressure data to identify a pressure range, either P1 or P2, that is associated with the pressure data. This can be done using a number of different methods. The maximum pressure value of the pressure data can be used to determine its pressure range. Alternatively, the minimum pressure value of the pressure data can be used to determine its pressure range. The average, or arithmetic mean or any of a number of other data smoothing or manipulation functions can be used to determine the pressure range of the pressure data. In the preferred embodiment, the pressure data is averaged to determine which pressure range, as between P1 and P2, the pressure data belongs in.

At step 642, after the pressure range is determined, the present invention then determines the character set associated with the identified pressure range. For instance, if the determined pressure range is P1, then the character set of FIG. 10 is selected. Alternatively, if the determined pressure range is P2, then the character set of FIG. 11 is selected. At step 644, the present invention then uses the spatial stroke data obtained from steps 610-625 to determine a particular character of the identified character set, e.g., the character, "q" of the character set of FIG. 10. Steps 644 and 642 can be done in any order. It is appreciated that a number of well known character recognition techniques can be used to analyze the spatial stroke data, including the technique described in U.S. Pat. No. 5,889,888, issued on Mar. 30, 1999 to Michael Albanese and Jeff Hawkins, which is incorporated herein by reference.

In addition to selecting between upper and lower case character sets, the process 640 of FIG. 13B can also be used to select between other types of character sets. For instance, pressure data can be used to select between character sets of different character fonts, or character sets of different character sizes, or character sets of different languages, or character sets of different character attributes (e.g., italic, bold, underline, shadow, color selection, superscript, etc.). It is appreciated that the application in which the user is selecting character sets and characters can be any application program that accepts character entry from a user, such as, for example, a graphics drafting program, a computer aided design program, an electronic spread sheet program, a word processor, an Internet browser, etc.

FIG. 14 illustrates that pressure data and spatial stroke data can be used together for user authentication. Since palm sized computers are portable and readily concealed, they can fall into the hands of unauthorized people. Using spatial stroke data and pressure, a user can write a signature on the digitizer and store the resulting information into memory. This can be used as a key for authentication into the palm sized computer 100. This type of key is very secure because while a person's signature can be found on paper, the pressure made at the different points in the signature will not be known from the paper and therefore very hard to duplicate by the unauthorized user. The rate of which various portions of the signature are written are also recorded by this method (by more or less data points being captured), which can also be used to distinguish authenticity and which cannot be determined by a signature on paper.

At FIG. 14, authentication process 650 assumes that a reference signature has already been entered into computer memory. Authentication is triggered at step 655, perhaps by a password application within computer 100 that is executed whenever the user turns on the computer 100 or wants to enter a new password. Authentication triggering is a well known step and can be invoked by a user pressing an on-screen icon or a mechanical button on system 100 (e.g., the power-on button). After authentication is requested, when the stylus 80 meets contact with the digitizer, step 660 is then entered. Steps 660-670 are analogous to steps 610-620 of FIG. 13A and FIG. 13B.

Data capturing can end at step 675 when the stylus 80 is lifted off of the digitizer or when a special button or icon is pressed by the user. At step 680, computer 100 compares the captured spatial stroke data and pressure data from steps 660-670 against stored spatial stroke data and pressure data from a reference signature (from memory). It is appreciated that a number of well known preprocessing steps can be performed before the comparison to prepare the data for the comparison. At step 685, if the data match is within a preselected threshold, then an authentication determination is made. In other words, if the reference data matches the captured data within a certain percentage, then the signature is determined to be authentic and access to the computer 100 is allowed, otherwise, access is prohibited.

Figure 15:
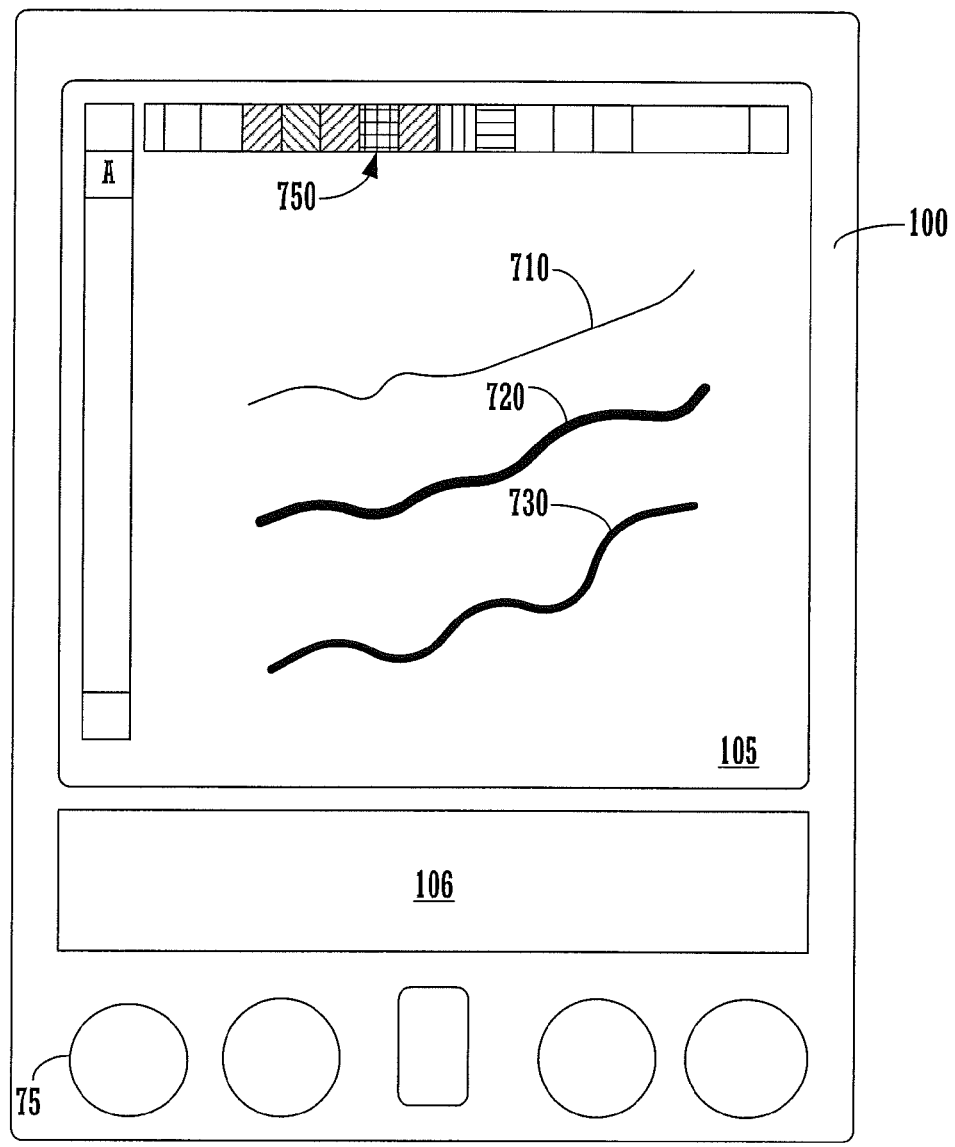
FIG. 15 illustrates a display of a palmtop computer system running a drawing or word processing application and using pressure related information for selecting an object width.

FIG. 15 illustrates that pressure data along with spatial data can be used to select certain display attributes within a graphics application. For instance, instead of selecting a particular icon or small button on the display screen 105 in order to change the width of a drawn line, the user instead uses pressure. For instance, soft pressure on the stylus to digitizer interface yields a thin line as shown in line 710. Line 710 is a representation of a user stroke drawn on the digitizer, either 106 or directly on the screen 105. A medium level pressure yields a thicker line shown as line 730. Lastly, a very high pressure yields a very thick line 720. Pressure can be used to differentiate a number of different display attributes in addition to object thickness, such as object fading, shading, and dotted or dashed graphics.

It is appreciated that because the icons and buttons 750 that are provided by the graphics application are small, it may be very hard to select these windows easily. Sometimes the buttons are hard to see and other times the wrong button is accidentally selected. Therefore, the present invention allows the user to utilize pressure on the digitizer to select certain display attributes within the graphics program rather than use the icons 750. This can be applied to any application program that allows character set selection or visual attribute selection, such as the selection between character sizes, character fonts, character attributes (italic, bold, underline, superscript, color selection, shadowing, etc.) and can be applied to a number of different applications, such as word processors, computer aided design, electronic spread sheets, Internet browsers, etc.

The preferred embodiment of the present invention, a method and system for using (x, y) stroke data with associated pressure data for performing improved handwriting recognition, user authentication and also handwriting-based data entry in a computer system, is thus described. While the present invention has been described in particular embodiments, it should be appreciated that the present invention should not be construed as limited by such embodiments, but rather construed according to the below claims.

What is claimed is:

1. In a portable computer system having an display, a digitizer, and a computer memory, a method of performing authentication comprising:
   accessing spatial stroke data and pressure data captured by a digitizer of the portable computer system and representing a user-drawn signature wherein respective pressure data is associated with respective spatial stroke data, wherein a display screen of the portable computer system comprises the digitizer;
   storing the spatial stroke data and pressure data into the computer memory;
   building a set of first vectors from the spatial stroke data and the pressure data;
   comparing the first vectors of spatial stroke data and pressure data of the user-drawn signature to stored second vectors based on the spatial stroke data and pressure data of a reference signature for a match;
   generating an authentication signal upon a match of the first vectors and the second vectors; and
   provided the authentication signal is generated, allowing a user access to the portable computer system, otherwise prohibiting the user from accessing a portion of the portable computer system.

2. A method as described in claim 1 wherein the computer system is a palm sized computer system.

3. A method as described in claim 1 wherein the accessing the spatial stroke data and pressure data further comprises the step of accessing speed information representing the user-drawn signature and wherein the comparing further comprises comparing the speed information with reference speed information of a reference signature for the match.

* * * * *